(12) United States Patent
Cho et al.

(10) Patent No.: US 9,417,788 B2
(45) Date of Patent: Aug. 16, 2016

(54) METHOD AND APPARATUS FOR PROVIDING USER INTERFACE

(75) Inventors: Berm-jin Cho, Yongin-si (KR); Yu-shik Whang, Seoul (KR); Hyun-gyoo Yook, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 12/957,993

(22) Filed: Dec. 1, 2010

(65) Prior Publication Data

US 2011/0131521 A1 Jun. 2, 2011

Related U.S. Application Data

(60) Provisional application No. 61/265,923, filed on Dec. 2, 2009, provisional application No. 61/265,939, filed on Dec. 2, 2009.

(30) Foreign Application Priority Data

Nov. 23, 2010 (KR) ........................ 10-2010-0116862

(51) Int. Cl.
 *G06F 3/0488* (2013.01)
 *G06F 3/0481* (2013.01)
 *G06F 9/44* (2006.01)
 *H04M 1/2745* (2006.01)
 *H04M 1/725* (2006.01)

(52) U.S. Cl.
 CPC .......... *G06F 3/04883* (2013.01); *G06F 3/0481* (2013.01); *G06F 9/4443* (2013.01); *H04M 1/274525* (2013.01); *H04M 1/72561* (2013.01); *H04M 2250/22* (2013.01)

(58) Field of Classification Search
 None
 See application file for complete search history.

(56) References Cited

U.S. PATENT DOCUMENTS

| | | | |
|---|---|---|---|
| 6,175,789 B1 | 1/2001 | Beckert et al. | |
| 2005/0102631 A1* | 5/2005 | Andreas et al. | 715/772 |
| 2005/0195390 A1 | 9/2005 | Jeon et al. | |
| 2006/0031784 A1 | 2/2006 | Makela | |
| 2006/0031785 A1* | 2/2006 | Raciborski | 715/859 |

(Continued)

FOREIGN PATENT DOCUMENTS

| CN | 101002166 A | 7/2007 |
|---|---|---|
| CN | 101267330 A | 9/2008 |

(Continued)

OTHER PUBLICATIONS

International Search Report issued Aug. 30, 2011 by the International Searching Authority in counterpart International Patent Application No. PCT/KR2010/008606.

(Continued)

*Primary Examiner* — Hien Duong
(74) *Attorney, Agent, or Firm* — Sughrue Mion, PLLC

(57) ABSTRACT

The apparatus includes: a memory which maintains an application driving a list of a plurality of items; a display controller which controls the list to be displayed on the screen which is divided into a plurality of areas and each of the plurality of items is located in each of the plurality of areas; a processor which detects a change of an operation progress status of the plurality of items, wherein the display controller provides a visual feedback corresponding to the operation progress status of at least one of the plurality of items in the area of a corresponding item, whose change of the operation progress status is detected.

20 Claims, 21 Drawing Sheets

(56) References Cited

U.S. PATENT DOCUMENTS

| | | |
|---|---|---|
| 2006/0218554 A1 | 9/2006 | Tobias et al. |
| 2006/0265503 A1 | 11/2006 | Jones et al. |
| 2006/0288329 A1 | 12/2006 | Gandhi et al. |
| 2007/0011665 A1 | 1/2007 | Gandhi et al. |
| 2007/0162872 A1 | 7/2007 | Hong et al. |
| 2008/0065782 A1 | 3/2008 | Jones |
| 2008/0168353 A1 | 7/2008 | Anzures et al. |
| 2008/0174570 A1* | 7/2008 | Jobs .................... G06F 3/0488 345/173 |
| 2008/0220752 A1* | 9/2008 | Forstall ................. H04M 1/56 455/415 |
| 2008/0256474 A1 | 10/2008 | Chakra et al. |
| 2008/0256477 A1* | 10/2008 | Cho et al. ..................... 715/772 |
| 2009/0106684 A1 | 4/2009 | Chakra et al. |
| 2009/0113334 A1* | 4/2009 | Chakra ................ G06F 9/4443 715/772 |
| 2009/0164933 A1* | 6/2009 | Pederson ............ G05B 19/409 715/772 |
| 2009/0307105 A1* | 12/2009 | Lemay et al. ................... 705/26 |
| 2010/0094934 A1* | 4/2010 | Svendsen .......... H04L 29/08729 709/204 |
| 2010/0115408 A1* | 5/2010 | Mujkic et al. ................. 715/716 |
| 2012/0023430 A1* | 1/2012 | Amidon ............ G06F 17/30053 715/772 |

FOREIGN PATENT DOCUMENTS

| | | | |
|---|---|---|---|
| EP | 1936482 | A1 | 6/2008 |
| EP | 2 184 670 | A1 | 5/2010 |
| JP | 2010-73014 | A | 4/2010 |
| KR | 1020080056678 | A | 6/2008 |
| WO | 2007/056449 | A2 | 5/2007 |
| WO | 2008030776 | A2 | 3/2008 |
| WO | 2009/023591 | A2 | 2/2009 |
| WO | 2010041826 | A2 | 4/2010 |

OTHER PUBLICATIONS

Communication dated Sep. 5, 2014 issued by the Australian Patent Office in counterpart Australian Patent Application No. 2010327454.
Communication dated Nov. 11, 2014 issued by the Japanese Patent Office in counterpart Japanese Patent Application No. 2012-541948.
Communication dated Dec. 29, 2014 issued by State Intellectual Property Office of People's Republic of China in counterpart Chinese Application No. 201080054238.2.
Communication, dated May 5, 2014, issued by the State Intellectual Property Office of the People's Republic of China in counterpart Chinese Application No. 201080054238.2.
Communication dated Jul. 28, 2015, issued by the Japanese Patent Office in counterpart Japanese Application No. 2012-541948, 5 pages in Japanese and English.
Communication issued Feb. 12, 2016, issued by the European Patent Office in counterpart European Patent Application No. 10834790.7.
Communication issued Jul. 1, 2016, issued by the European Patent Office in counterpart European Patent Application No. 10834790.7.

* cited by examiner

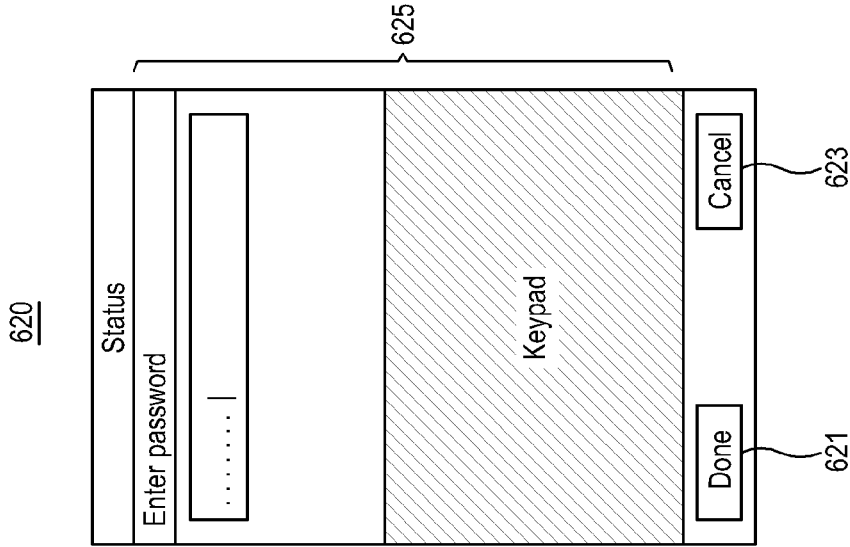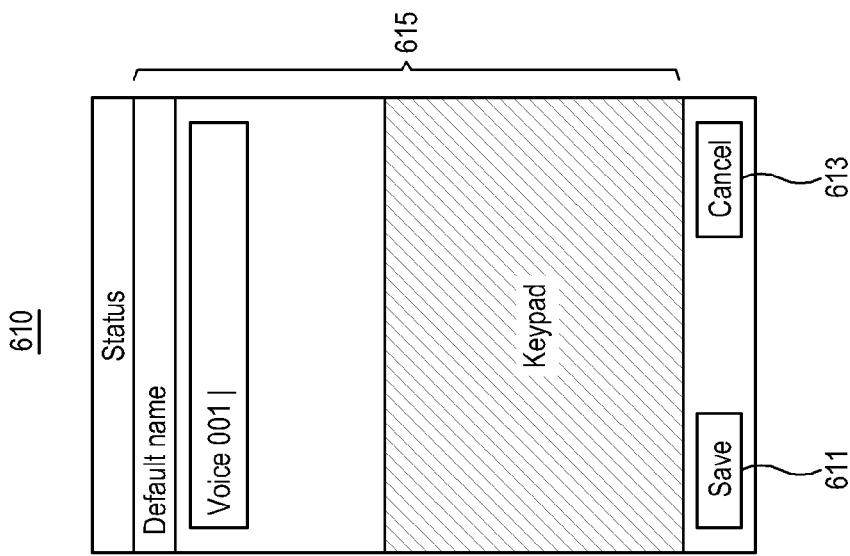

| 📶 | | | 🔋 |
|---|---|---|---|
| 📡 | CNN.com | | 2/25 |
| 📡 | The Onion | | 5/5 |
| 📡 | mONSTER de | | 5/5 |
| 📡 | Downloading ---- 1818 | | |
| 📡 | Engadget | | 100/100 |
| 📡 | Wired | | 10/10 |
| 📡 | Downloading ---- 1819 | | |
| ➕ | | | 🔍 |

| 📶 | | | 🔋 |
|---|---|---|---|
| 📡 | CNN.com | | 2/25 |
| 📡 | The Onion | | 5/5 |
| 📡 | mONSTER de | | 5/5 |
| | Downloading ---- 1838 | | |
| 📡 | Engadget | | 100/100 |
| 📡 | Wired | | 10/10 |
| 📡 | mtv mobile Rss reader ---- 1834 | | 5/5 |
| ➕ | | | 🔍 |

1839

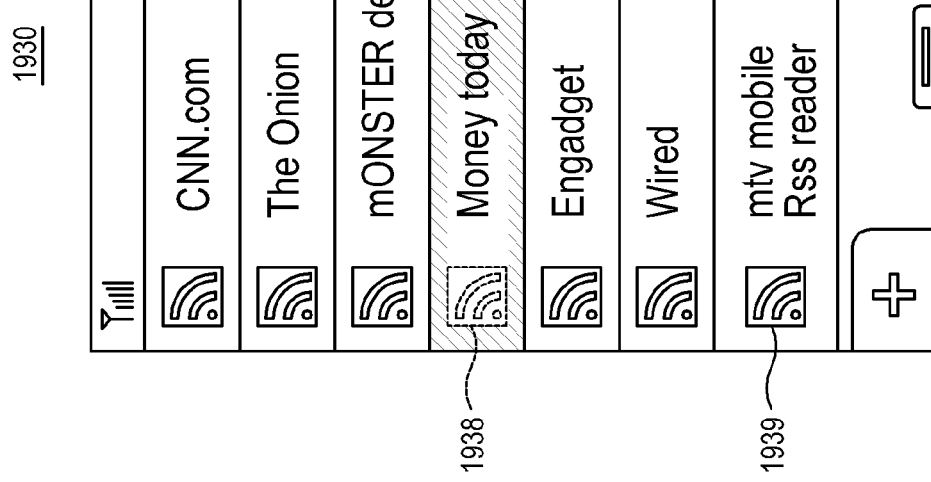
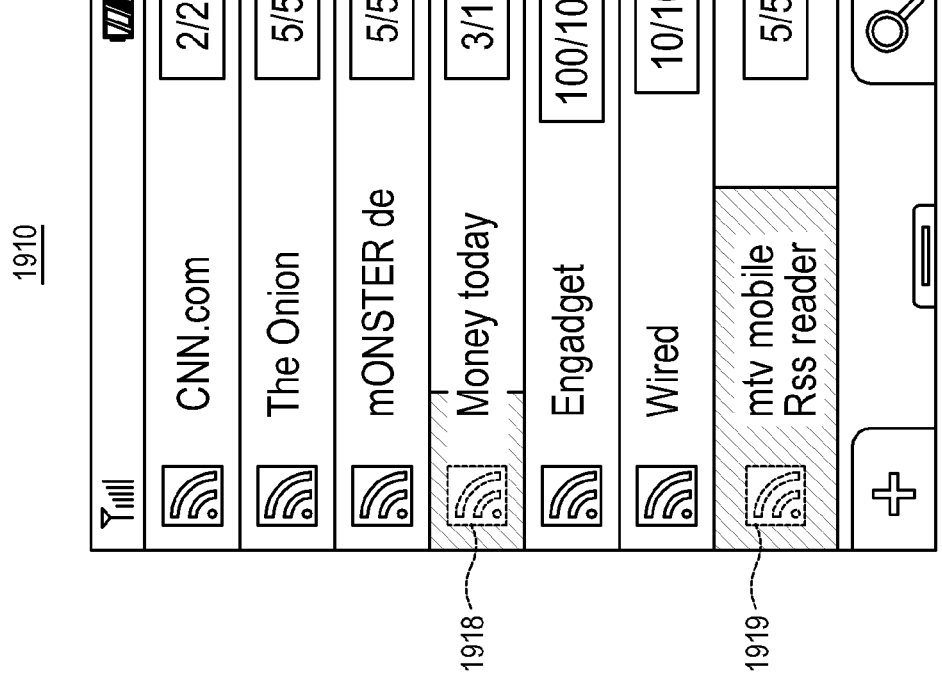

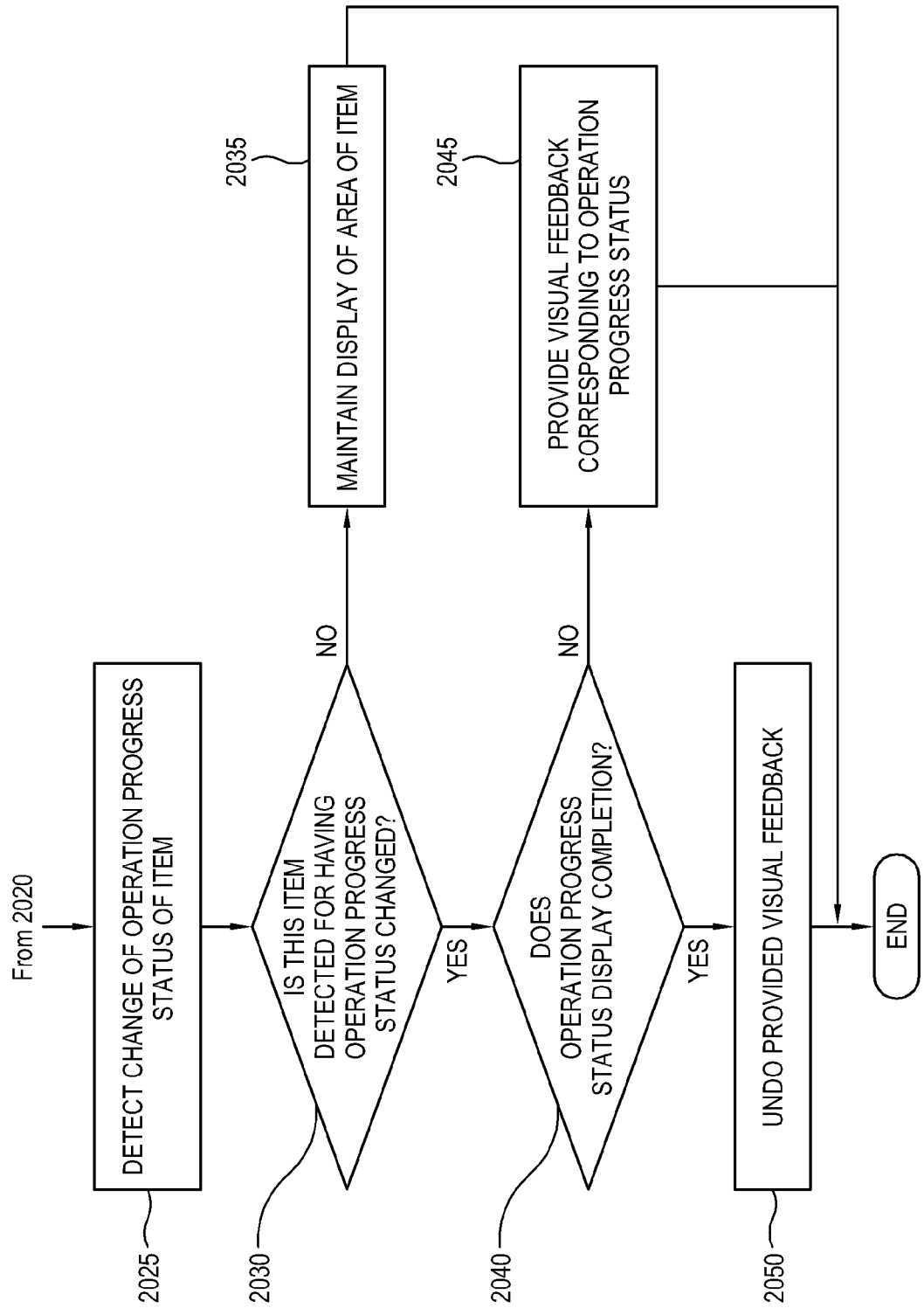

METHOD AND APPARATUS FOR PROVIDING USER INTERFACE

CROSS-REFERENCE TO RELATED APPLICATIONS

This application claims priority from U.S. Provisional Application Nos. 61/265,923 and 61/265,939, filed Dec. 2, 2009, and Korean Patent Application No. 10-2010-0116862 filed Nov. 23, 2010, in the Korean Intellectual Property Office, the disclosures of which are incorporated herein by reference in their entireties.

BACKGROUND

1. Field

Apparatuses and methods consistent with exemplary embodiments relate to a method and an apparatus for providing a user interface, and more particularly, to a method and an apparatus for providing a more efficient user interface by using a screen configuration.

2. Description of the Related Art

A user interface (UI) may provide a temporary or continuous access to enable a communication between a user and an object, a system, a device or a program. The UI may include a physical or virtual medium. Generally, the UI may be divided into an input by which a user manipulates a system and an output by which a response or result of the input to the system is displayed.

Input needs an input device to move a cursor on a screen or to receive a user's manipulation to select a particular object. For example, the input device may include a button, a key, a mouse, a track ball, a touch pad, a joy stick or a touch screen. Output needs an output device to identify a response to the input by using user's sense of sight, hearing or touch. For example, the output device may include a display apparatus, a touch screen, a speaker or an oscillator.

The touch screen may provide both input and output through a screen. A user may touch the screen by using his/her finger or a stylus. A computer may recognize the touch on the touch screen, analyze the touch and perform a corresponding operation based on the touch.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

According to an aspect of an exemplary embodiment, there is provided an apparatus for providing a user interface, the apparatus including: a memory which maintains an application driving a list of a plurality of items—a screen displaying the list thereon is divided into a plurality of areas and the item is located in each of the plurality of areas; a display controller which controls the list to be displayed on the screen; a processor which detects a change of an operation progress status of the plurality of items, and the display controller providing a visual feedback corresponding to the operation progress status of at least one of the items in an area of the at least one of items, the change of the operation progress status of which is detected, among the plurality of items.

The display controller may display a progress bar corresponding to the operation progress status of the at least one item in the area of the at least one detected item.

The display controller may undo the visual feedback provided to the item which displays a completion of the operation progress status in an area of the item, the operation progress status of which displays the completion among the at least one item.

The memory may maintain types of available lists, the processor may detect the type of the list, and the display controller may receive from the memory a display control method corresponding to the type of the list among the types of the list, and display the display control method on the screen.

The types of the list may include a basic list in which the plurality of items is sequentially arranged, a grouping list in which the plurality of items is grouped and arranged according to a preset classification standard, and an expandable list in which additional information or a subordinate item of the item selected among the plurality of items is inserted into the list.

The display controller may control the M number of soft keys corresponding to the M number of options—M is a preset integer or less—among the N number of options provided in a menu of the application to overlay the list on the screen.

If N is larger than M, an option menu may be added to the screen—the option menu displays a window including the 'N-M' number of options which is not included in the M number of options among the N number of options as a response to a touch gesture selecting the option menu.

The M number of soft keys may be provided in a lower left side and a lower right side of the screen and is labeled as at least one of an icon and a text displaying the M number of options, and the option menu may be provided between the lower left side and the lower right side, and take a smaller area than the M number of soft keys.

If an overlaying area between the plurality of items of the list and the M number of soft keys occurs, the display controller may insert a dummy area in a preset size into one of an upper part and a lower part of the item corresponding to the overlaying area and moves a location of the item corresponding to the overlaying area on the screen.

The processor may determine whether to select a first item as a response to a touch gesture in an area excluding an area of the M number of soft keys in the area of the first item if the M number of soft keys overlays at least a part of the area of the first item among areas of the plurality of items.

According to an aspect of another exemplary embodiment, there is provided a method for providing a user interface, the method including: maintaining in a memory an application which drives a list of a plurality of items—a screen which displays the list thereon is divided into a plurality of areas and the item is provided in each of the plurality of areas; displaying the list on the screen; detecting a change of an operation progress status of the plurality of items; and providing a visual feedback corresponding to the operation progress status of at least one item in an area of the at least one item, the change of the operation progress status of which is detected, among the plurality of items.

The providing of the visual feedback may include displaying a progress bar in the area of the at least one detected item corresponding to the operation progress status of the at least one item.

The providing of the visual feedback may include undoing the visual feedback provided to the item displaying a completion of the operation in the area of the item among the at least one item.

The method may further include maintaining in the memory types of available lists, and detecting the type of the list, wherein the displaying of the list on the screen may include receiving from the memory a display control method corresponding to the type of the list among the types of the list and displaying the list on the screen.

The types of the list may include a basic list in which the plurality of items is sequentially arranged, a grouping list in which the plurality of items is grouped and arranged according to a preset classification standard, and an expandable list in which additional information or a subordinate item of the item selected among the plurality of items is inserted into the list.

The displaying of the list on the screen may include overlaying the M number of soft keys to the list corresponding to the M number of options (M is a preset integer or less) among the N number of options included in a menu of the application on the screen.

If N is larger than M, an option menu may be added to the screen—the option menu displays a window including the 'N-M' number of options which is not included in the M number of options among the N number of options as a response to a touch gesture selecting the option menu.

The M number of soft keys may be provided in a lower left side and a lower right side of the screen and is labeled as at least one of an icon and a text displaying the M number of options, and the option menu may be provided between the lower left side and the lower right side, and take a smaller area than the M number of soft keys.

The displaying of the list on the screen may include inserting a dummy area in a preset size into one of an upper part and a lower part of the item corresponding to an overlaying area between the plurality of items of the list and the M number of soft keys and moving a location of the item corresponding to the overlaying area on the screen if the overlaying area between the plurality of items of the list and the M number of soft keys occurs.

The method may further include determining whether to select a first item as a response to a touch gesture in an area excluding an area of the M number of soft keys from the area of the first item if the M number of soft keys overlays at least a part of the area of the first item among areas of the plurality of items.

BRIEF DESCRIPTION OF THE DRAWINGS

The above and/or other aspects will become more apparent from the following description of exemplary embodiments, taken in conjunction with the accompanying drawings, in which:

FIGS. 6A and 6B illustrate an example of a screen configuration which includes a soft key in the apparatus according to an exemplary embodiment;

FIGS. 18A and 18B illustrate an example of a screen configuration with respect to a list including an operation progress status in the apparatus according to an exemplary embodiment;

FIGS. 19A and 19B illustrate an example of a screen configuration with respect to a list including an operation progress status in the apparatus according to an exemplary embodiment;

FIG. 21 is a flowchart of a method for providing a user interface to display the list according to an exemplary embodiment.

DETAILED DESCRIPTION OF EXEMPLARY EMBODIMENTS

Figure 1:
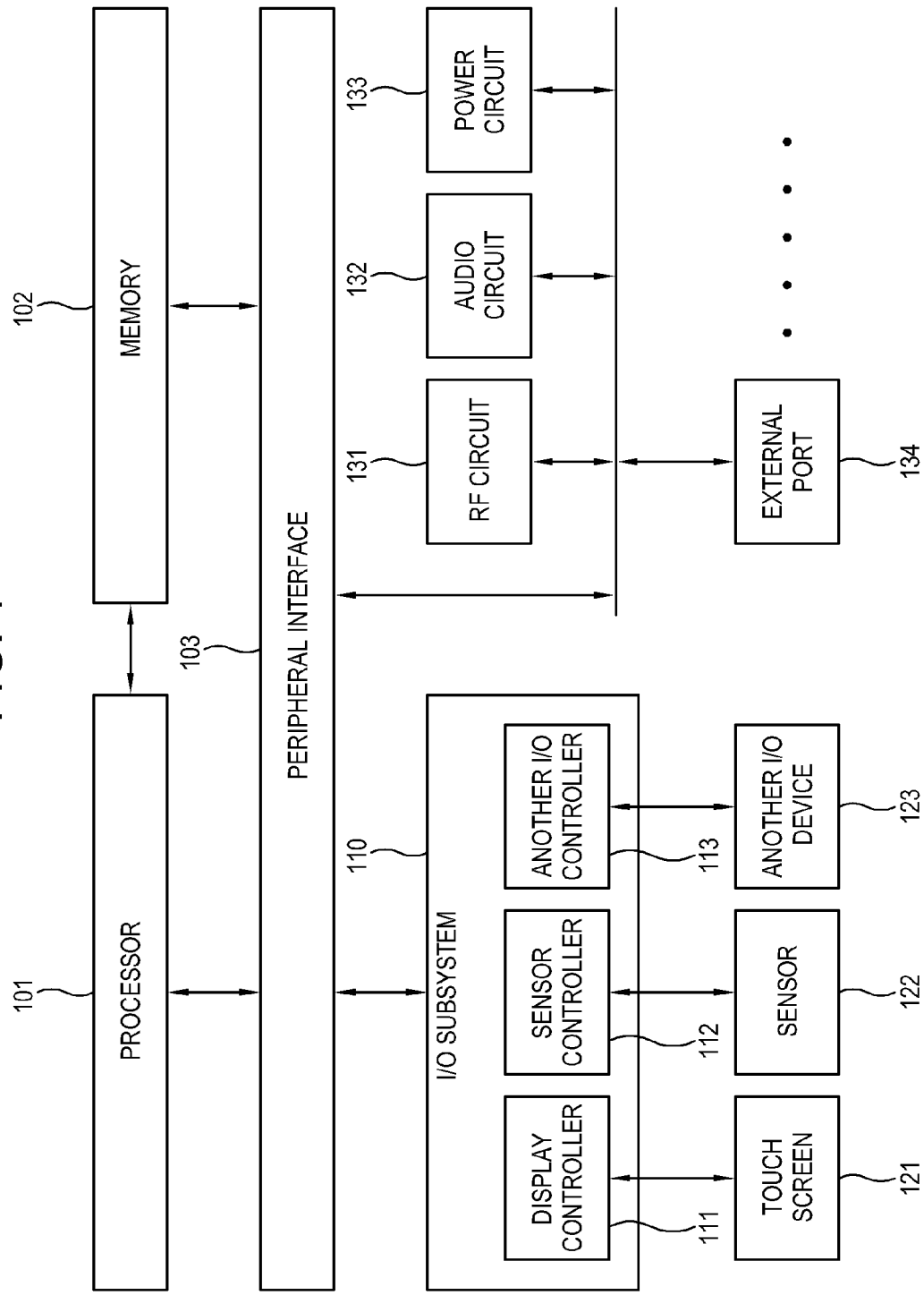
FIG. 1 is a block diagram of a device which includes a touch screen according to an exemplary embodiment.

Certain exemplary embodiments are described in greater detail below with reference to accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters.

A computer system is used as a reference to explain exemplary embodiments. The skilled in the art may fully understand that the system and methods as described below are applicable to a voluntary display system including a user interface.

"Exemplary embodiment", "example", "aspect" and "exemplification" used herein shall not be construed that the discretionary aspect or design explained herein are better or more advantageous than other aspects or designs.

"Component", "module", "system" and "interface" used hereinbelow means a computer-related entity in general, and e.g., may mean hardware, a combination of hardware and software, or software.

"Or" means an "inclusive or" rather than "exclusive or". That is, unless otherwise stated or explicit in the context, the expression "x uses a or b" means one of natural inclusive permutations.

The singular used herein should be interpreted as including "one or more" unless otherwise stated or explicit in the context regarding the singular type.

"And/or" used herein should be understood as referring to and including all of available combinations of at least one item of listed, relevant items.

"Include" and/or "including" means that the concerned property, step, operation, module, elements and/or components exist, but does not exclude that one or more of other properties, steps, operations, modules, elements and component and/or a group thereof exist or are added.

"First", "Second", etc. may be used herein to explain various elements, but the elements are not limited to such terms. The terms are used only to distinguish two or more elements and there is no order or order of priority between the elements.

Hereinafter, an apparatus according to an exemplary embodiment will be described. In an exemplary embodiment, the apparatus, a user interface (UI) for the apparatus and a relevant process for using the apparatus will be described. Such apparatus may include a device which further includes a PDA function, a music playing or calling function and other functions. However, all or part of the apparatus, the user interface and the relevant process according to an exemplary embodiment which will be described below are applicable to digital devices such as a personal computer, a laptop computer, a digital television (DTV), etc.

The apparatus may support at least one of a telephone application, a video conference application, an e-mail application, an instant messaging application, a blogging application, a photo managing application, a digital camera application, a digital video camera application, a web browsing application, a digital music playing application and a digital video playing application.

The various applications above may use, e.g., a physical or virtual UI. For example, a user may change or move information displayed on a touch screen within a single application or to another application through the physical or virtual UI. The apparatus may support various applications by using a physical or virtual UI that is intuitive and clear and uses a common physical or virtual architecture.

FIG. 1 is a block diagram of an apparatus 100 which includes a touch screen 121 according to an exemplary embodiment.

The apparatus 100 may include at least one processor 101, a memory 102, a peripheral interface 103, an input/output (I/O) subsystem 110, a touch screen 121, a sensor 122, another I/O device 123, a radio frequency (RF) circuit 131, an audio circuit 132, a power circuit 133 and an external port 134. Such components may communicate with each other through at least one communication bus or signal line.

FIG. 1 illustrates an example of the apparatus 100, and the apparatus 100 may include more or fewer components, or have a configuration or arrangement integrating two or more components or including different components. The components shown in FIG. 1 may include hardware including an integrated circuit customized for at least one signal processing or application, software or a combination of hardware and software.

The memory 102 may include, e.g., a high-speed random access memory, a magnetic disk, an SRAM, a DRAM, a ROM, a flash memory or a non-volatile memory. The memory 102 may include a software module, an instruction set or other various data. An access to the memory 102 by other components such as the processor 101 and the peripheral interface 103 may be controlled by the processor 101.

The peripheral interface 103 may integrate the input and/or output peripheral device of the apparatus 100 to at least one processor 120 and memory 102. The processor 101 may perform various functions and process data by executing the software module or the instruction set stored in the memory 102.

The RF circuit 131 may transmit and receive an RF signal which is also known as an electromagnetic signal. The RF circuit 131 may convert an electric signal into an electromagnetic signal, convert an electromagnetic signal into an electric signal and communicate with a communication network or other communication devices through an electromagnetic signal. The RF circuit 131 may include a known circuit to perform the foregoing function. The known circuit may include an antenna system, an RF transmitter/receiver, at least one amplifier, a tuner, at least one oscillator, a digital signal processor, a codec chipset, a subscriber identification module (SIM) card, and a memory, but not limited thereto. The RF circuit 131 may communicate in a wireless communication with a cellular phone network, a wireless network such as wireless local area network (LAN) and/or metropolitan area network (MAN), a network such as an intranet and/or the Internet also called the World Wide Web (WWW) and other devices. Such wireless communication may include an e-mail protocol such as Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (Wi-Fi) for IEEE 802.11a, IEEE 802.11b, IEEE 802.11g and/or IEEE 802.11n, Voice over Internet Protocol (VoIP), Wi-MAX, Long Term Evolution (LTE), Internet Message Access Protocol (IMAP) and/or Post Office Protocol (POP); an instant messaging protocol such as eXtensible Messaging and Presence Protocol (XMPP), Session Initiation Protocol for Instant Messaging and Presence Leveraging Extensions (SIMPLE), Instant Messaging and Presence Service (IMPS) or Short Message Service (SMS) or communication protocols which are not developed at the time of the application date of the present application. In addition to the foregoing wireless communication, other communication standards, protocols and technology may be used.

The audio circuit 132 may provide an audio interface between a user and the apparatus 100 by using a speaker and/or a microphone. The audio circuit 132 may receive audio data from the peripheral interface 103, convert audio data into electric signals and transmit electric signals to the speaker. The speaker may convert the electric signal into a human-audible sound wave. The audio circuit 132 may receive an electric signal converted from a sound wave by a microphone. The audio circuit 132 may convert an electric signal into audio data, and transmit the audio data to the peripheral interface 103 to process the audio data. The audio data may be searched from or transmitted to the memory 102 or the RF circuit 131 by the peripheral interface 103. According to an aspect, the audio circuit 132 may further include a headset jack. The headset jack may provide an interface between a headset including input and output devices or a portable audio I/O peripheral device such as an output headphone.

The power circuit 133 may supply power to all or part of the components of the apparatus 100. For example, the power circuit 133 may include a power management system, at least one power source such as a battery or alternating current (AC) power source, a charging system, a power failure detection circuit, a power transformer or inverter, a power indicator and other voluntary components for generating, managing and distributing power.

The I/O subsystem 110 may integrate an I/O peripheral device such as the touch screen 121, the sensor 122 or the another input control device 123 to the peripheral interface 103. The I/O subsystem 110 may include a display controller 111, a sensor controller 112 or at least one I/O controller 113. According to another aspect, the touch screen 121, the sensor 122 or the input control device 123 may be integrated directly to the peripheral interface 103, instead of through the I/O subsystem 100.

According to another aspect, at least one of the processor 101, the peripheral interface 103 and the I/O subsystem 110 may be provided in a single chip. Otherwise, a part of at least one of the processor 101, the peripheral interface 103 and the I/O subsystem 110 may be provided in a single chip.

The display controller 111 may receive an electric signal from the touch screen 121 including a touch-detection area, transmit an electric signal to the touch screen 121 or transmit and receive an electric signal to/from the touch screen 121. By a control of the display controller 111, the touch screen 121 may display thereon a visual output for a user. The visual output may include a graphic, a text, an icon, a video and a combination of the foregoing elements (collectively, the "graphic"). According to an aspect, a part or all of the visual output may correspond to a user interface which will be described later in more detail.

The touch screen 121 may include a liquid crystal display (LCD), a light emitting polymer display (LPD), an organic light emitting diode (OLED), an active-matrix organic light-emitting diode (AMOLED) or other displays. The touch screen 121 and the display controller 111 may employ capacitive technology, resistive technology, infrared technology and surface acoustic wave technology, but not limited thereto, and may further include other known technologies or touch detection technology which will be developed in the future. The touch screen 121 and the display controller 111 may detect a contact point, its movement or release by using a proximity sensor array or other elements to determine at least one contact address with the touch screen 121.

The display controller 111 may be coupled with a screen which does not include a touch-detection area. The touch-detection area excluding screen may receive an electric signal from the display controller 111 and display a visual output for a user. The touch-detection area excluding screen may include a plasma display panel (PDP), an electronic paper display (EPD), a liquid crystal display (LCD), a light emitting polymer display (LPD), an organic light-emitting diode (OLED), an active-matrix organic light-emitting diode (AMOLED) and other displays. The apparatus 100 which employs the screen excluding the touch-detection area may provide an I/O device such as a keyboard, a mouse or a physical button as a user interface.

The at least one another I/O controller 113 may receive an electric signal from the another I/O device 123 or transmit an electric signal to the another I/O device 123. The another I/O control device 123 may include, e.g., a button, a keyboard, a touch pad, a dial, a slider switch or a joy stick. The another I/O controller 113 may be integrated to any of an infrared port, a USB port and a mouse.

According to an aspect, the another I/O control device 123 may include at least one physical or virtual button. In the case of the virtual button, the button and a button controller may be a part of the touch screen 121 and the display controller 111, respectively. According to an aspect, the button may include an up/down button, a locker button or a push button to adjust a volume of the speaker 111 or the microphone 113. For example, if a user presses the push button briefly, the touch screen 121 is unlocked and an unlocking process may be initiated by applying a gesture to the touch screen. Otherwise, a user may press the push button long to turn on or turn off power to the apparatus 100.

According to another aspect, the another I/O control device 123 may include at least one physical keyboard or virtual soft keyboard. As an example of the keyboard, Qwerty and/or non-Qwerty may be used. In the virtual soft keyboard, the soft keyboard and the soft keyboard controller may be a part of the touch screen 121 and the display controller 111, respectively. The soft keyboard according to an exemplary embodiment may include a fewer number of graphics (or soft keys) than the physical keyboard. Then, a user may select at least one graphic of the soft keyboard, and display at least one corresponding symbol on the touch screen 121.

According to another aspect, the another I/O control device 123 may include a touch pad to enable or disable a particular function. According to another aspect, the touch pad may include a touch-detection area which does not display thereon the visual output unlike the touch screen. The touch pad may include a touch-detection surface separated from the touch screen 121, or a part of the touch-detection surface formed and extended from the touch screen 121.

Figure 2:
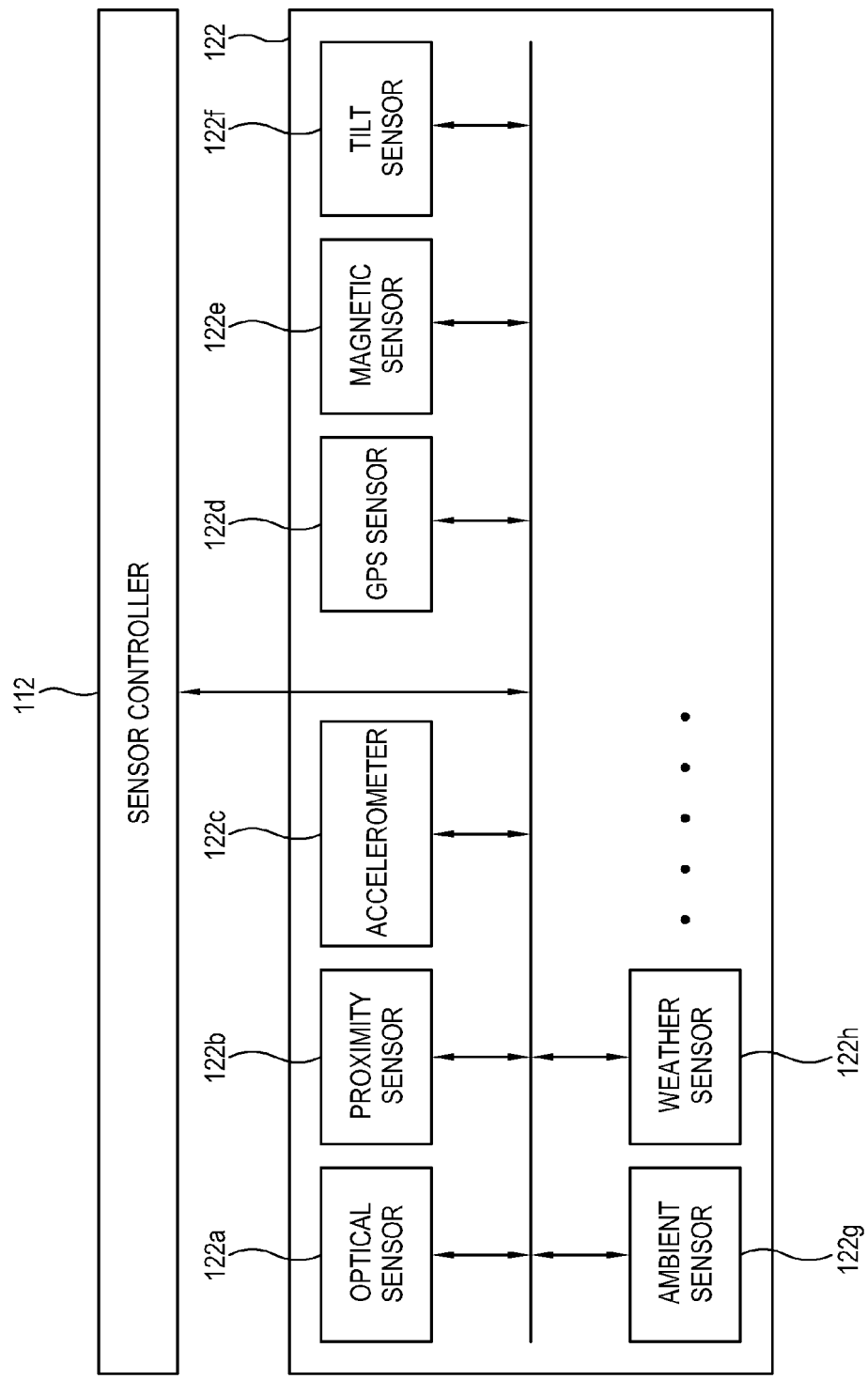
FIG. 2 is a block diagram of a connection between a sensor controller and various types of sensors according to an exemplary embodiment.

FIG. 2 is a block diagram of a connection between the sensor controller 112 and various types of sensors 122 according to an exemplary embodiment.

The sensor controller 112 may receive an electric signal from the sensor 122, transmit an electric signal to the sensor 122 or transmit and receive an electric signal to/from the sensor 122. The sensor 122 may include an optical sensor 122, a proximity sensor 122b, an accelerometer 122c, a GPS sensor 122d, a magnetic sensor 122e, a tilt sensor 122f, an ambient sensor 122g and a weather sensor 122h, but not limited thereto.

According to an aspect, the sensor 122 may include at least one optical sensor 122a. FIG. 2 illustrates the optical sensor 122a which is integrated to the sensor controller 112 of the I/O subsystem 110. The optical sensor 122a may be integrated to the peripheral interface 103. The optical sensor 122a may include a charge coupled device (CCD) or complementary metal oxide semiconductor (CMOS) photo transistor. The optical sensor 122a may receive light emitted through at least one lens from the environment and convert such light into image data. Together with an image module 143, a so-called camera module, the optical sensor 122a may capture a still image or video. According to another aspect, to use the touch screen display as a view finder to acquire at least one of a still image and a video, the optical sensor 122a may be provided in a rear side or a front side of the apparatus 100. According to an aspect, to acquire an image of a user for a video conference while a user views other video conference attendees on the touch screen display, the optical sensor 122a may be provided in the front side of the apparatus 100. According to another aspect, a user may rotate a lens and a sensor of the apparatus housing to change a location of the optical sensor 122a so that the single optical sensor 122a acquires a still image or a video for the video conference. Further, the apparatus 100 may detect the light amount from the optical sensor 122a, adjust a brightness of a particular area of the touch screen 121 by using a value corresponding to the light amount, or adjust a brightness of a graphic on the touch screen 121.

According to an aspect, the sensor 122 may include at least one proximity sensor 122b. FIG. 2 illustrates the proximity sensor 122b which is connected to the sensor controller 112 of the I/O subsystem 110. Otherwise, the proximity sensor 122b may be connected to the peripheral interface 103. The proximity sensor 122b may detect whether any object is proximate to the apparatus 100. For example, the proximity sensor 122b may provide an on or off value with respect to a detection/non-detection of the object. According to an aspect, when the apparatus 100 is proximate to a user's ear like talking over the phone, the proximity sensor 122b may turn off the touch screen 121 to thereby prevent unnecessary battery consumption.

According to another aspect, the sensor 122 may further include at least one of accelerometers 122c. FIG. 2 illustrates the accelerometer 122c which is connected to the sensor controller 112 of the I/O subsystem 110. Otherwise, the accelerometer 122c may be connected to the peripheral interface 103. The accelerometer 122c may detect a change of speed of the apparatus 100 or a direction of the apparatus 100. For example, the accelerometer 122c may measure an accelerating vector value of the apparatus 100 in three axes of X, Y and Z. The accelerometer 122c may provide a displacement value per hour corresponding to the three axes. According to an aspect, information may be displayed on the touch screen 121 vertically or transversely on the basis of the analysis of data transmitted from the at least one accelerometer 122c.

According to another aspect, the sensor 122 may further include at least one GPS sensor 122d. FIG. illustrates the GPS sensor 122d which is connected to the sensor controller 112 of the I/O subsystem 110. Otherwise, the GPS sensor 122d may be connected to the peripheral interface 103. The GPS sensor 122d may receive at least one satellite signal, process the received signal and detect a location of the apparatus 100 on earth. For example, the GPS sensor 122d may provide latitude, longitude and altitude values of the apparatus 100 based on the detected value. For example, the GPS sensor 122d may provide the latitude value of −90 up to +90 degrees and the longitude value of −180 up to +180 degrees. According to an aspect, the location of the apparatus 100 on earth may be displayed on the touch screen 121 on the basis of the analysis of data transmitted from the GPS sensor 122d.

According to another aspect, the sensor 122 may further include at least one magnetic sensor 122e. FIG. 2 illustrates the magnetic sensor 122e which is connected to the sensor controller 112 of the I/O subsystem 110. Otherwise, the magnetic sensor 122e may be connected to the peripheral interface 103. For example, the magnetic sensor 122e may detect an intensity or a change of a magnetic field generated on earth, process the detected signal and determine a direction value of the apparatus 100. For example, the magnetic sensor 122e may provide the intensity and change of the magnetic field as values of three axes of X, Y and Z based on the detected value. According to an aspect, the apparatus 100 may change a rotation of a predetermined icon on the touch screen 121 by using the value provided by the magnetic sensor 122e.

According to another aspect, the sensor 122 may further include at least one tilt sensor 122f. FIG. 2 illustrates the tilt sensor 122f which is connected to the sensor controller 112 of the I/O subsystem 110. Otherwise, the tilt sensor 122f may be connected to the peripheral interface 103. The tilt sensor 122f may include at least one accelerometer and at least one magnetic sensor. The tilt sensor 122f may provide, e.g., azimuth, pitch and roll values by using the values of three axes of X, Y and Z detected from the sensors. For example, the tilt sensor 122f may provide the value ranging from zero to 360 degrees as an azimuth value, the value ranging from −180 to +180 degrees as a pitch value, and the value ranging from −90 to +90 degrees as a roll value. The apparatus 100 according to an aspect may detect a user's gesture gripping and moving the apparatus 100 by using the tilt sensor 122f.

According to another aspect, the sensor 122 may further include at least one ambient sensor 122g. FIG. 2 illustrates the ambient sensor 122g which is connected to the sensor controller 112 of the I/O subsystem 110. Otherwise, the ambient sensor 122g may be connected to the peripheral interface 103. The ambient sensor 122g may detect temperature, humidity and intensity of illumination of the ambient environment of the apparatus 100. The ambient sensor 122g may acquire the detected value per hour. For example, the ambient sensor 122g may provide humidity values ranging from zero to 100%, and temperature in Fahrenheit or Celsius, and the intensity of illumination from level zero to 10. According to an aspect, the apparatus 100 may display on the touch screen 121 the value of the ambient environment of the apparatus 100 acquired through the ambient sensor 122g.

According to another aspect, the sensor 122 may further include at least one weather sensor 122h. FIG. 2 illustrates the weather sensor 122h which is connected to the sensor controller 112 of the I/O subsystem 110. Otherwise, the weather sensor 122h may be connected to the peripheral interface 103. The weather sensor 122h may provide information on humidity, temperature or weather. The weather information relating to a particular day or time may be acquired from an external server. The server may provide weather information based on information of a user's location. According to an aspect, the apparatus 100 may transmit to the server an http request signal including location information. The server may search the weather information on the location based on the location information of the apparatus 100, and provide the apparatus 100 with the searched information as an eXtensible Markup Language (XML) document. For example, the weather sensor 122h may provide the value of humidity ranging from zero to 100%, and the temperature in Fahrenheit or Celsius, and the condition relating to weather as an integer.

Returning to FIG. 1, the apparatus 100 may perform an operation combining a predetermined function through a screen including a touch-detection area such as the touch screen 121 (or touch pad). In this case, a basic input/control is available on the touch screen 100 for the operation of the apparatus 100, and the number of a physical input/output device such as a push button, keyboard and dial of the apparatus 100 may be reduced.

To perform the operation combining the predetermined function through the touch screen 121, a UI may be displayed on the touch screen 121 for navigation. According to an aspect, if a user touches the touch screen 121, the touch screen 121 may provide a UI such as a main menu or root menu. According to another aspect, the apparatus 100 may provide a physical push button or other physical input and control devices as a UI.

According to an aspect, the apparatus 100 may perform the operation combining the predetermined function through a screen excluding the touch-detection area. The apparatus 100 may use a UI such as a physical keyboard, a mouse and a physical button as a basic input/control device. According to an aspect, if a user manipulates a physical UI, the apparatus 100 may display a visual output on the screen excluding the touch-detection area corresponding to a user's manipulation.

According to another aspect, the apparatus 100 may perform the operation combining the predetermined function through both the touch screen 121 (or touch pad) including the touch-detection area, and the screen excluding the touch-detection area. The apparatus 100 may use at least one of a physical UI and a virtual UI as a basic input/control device. According to an aspect, if a user touches the physical UI or manipulates the virtual UI, the apparatus 100 may interact with the physical or virtual UI and display the result of a user's touch or manipulation on at least one of the touch screen 121 including the touch-detection area and the screen excluding the touch-detection area.

The touch screen 121 may provide a UI between the apparatus 100 and a user. For example, the touch screen 121 may include a touch-detection surface, a sensor or a sensor set which detects a user's input based on a haptic contact or a tactile contact. The touch screen 121 and the display controller 111 may detect a contact, a movement of such contact or a release of contact on the touch screen 121, and convert such detected contact into an interaction with the UI (graphic, at least one soft key, icon, web page or image) displayed on the touch screen 121. According to an aspect, a contact address between the touch screen 121 and a user may correspond to a user's finger, a voluntary object such as a stylus or an appendage. According to an aspect, the UI is designed to operate by a contact mainly based on a user's finger and gesture, which is less accurate than the input by the stylus since the former has a larger contact area on the touch screen 121. In this case, the apparatus 100 may analyze a finger-based rough input as a location or command of an accurate pointer or cursor to perform a desired operation.

The touch screen 121 may display at least one graphic as a UI. According to an aspect, a user may contact (touch) and select at least one graphic by using at least one of his/her fingers. According to another aspect, if a user releases the contact of the at least one graphic, the at least one graphic may be selected. According to an aspect, a user's gesture may include a touch to select a graphic or an area relating to the graphic, a tap which is a gesture touching and releasing the touch to execute a graphic application or receive another graphic, a double tap increasing or decreasing the graphic, a hold maintaining a touch for predetermined time to receive a detailed menu relating to the graphic, a touch and move touching and moving (left to right, right to left or up and down and down and up) or releasing such touch to scroll an item list, a flick or swipe touching, moving and releasing such touch within short time to move to a superior or subordinate list relating to the graphic or to execute other useful functions, and a drag and drop to move the graphic to a desired location. According to an aspect, an accidental contact of the graphic may not select the graphic. For example, if the gesture corresponding to the selection is a tap, a predetermined application may not be selected by a swipe going over the graphic relating to such application. According to another aspect, the apparatus 100 may employ a heuristic method to determine a user's gesture accurately. According to an aspect, cumulative data of a user's gesture, user's characteristics and pattern may be detected and analyzed by the heuristic method, and the apparatus 100 may determine the intent of such user's gesture by using the analyzed data, characteristic and pattern.

According to an aspect, the touch screen 121 may display a virtual soft keyboard as a UI. A user may select at least one graphic (or soft key) of the soft keyboard and display at least one symbol on the touch screen 121. The soft keyboard according to an exemplary embodiment may be adaptive. For example, the displayed graphic may be adjusted by a user's action selecting at least one graphic or at least one symbol. At least one application of the apparatus 100 may employ a common keyboard or different keyboards. Accordingly, the used soft keyboard may be customized for at least a part of the applications or for each user. For example, the at least one soft keyboard according to an exemplary embodiment may be customized for each user on the basis of a word usage record of such user. The soft keyboard may be adjusted to reduce a user's mistake when he/she selects at least one graphic and at least one corresponding symbol.

Hereinafter, an example of a configuration of the memory 102 which is included in the apparatus 100 will be described in more detail with reference to FIG. 3.

Figure 3:
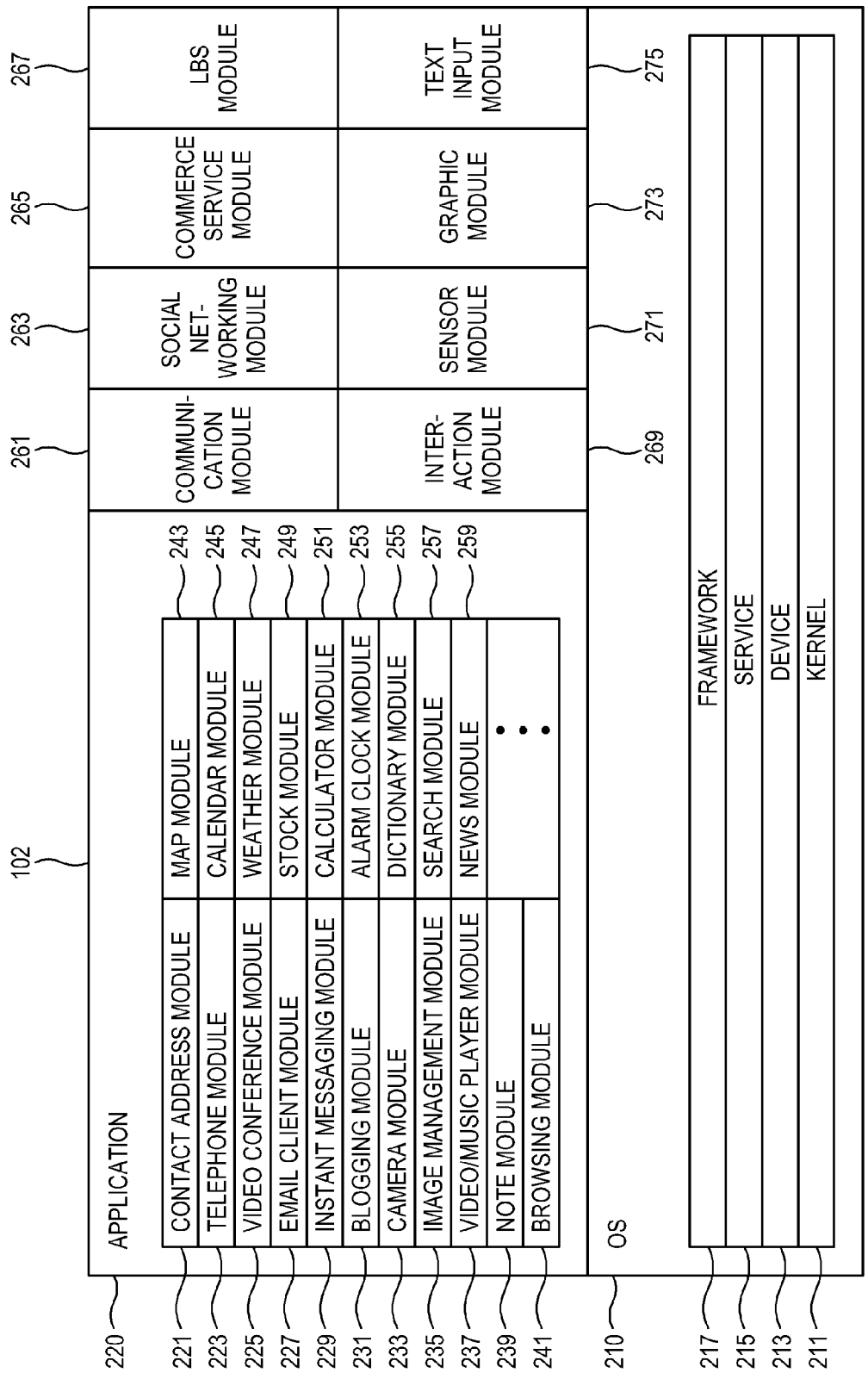
FIG. 3 illustrates an example of a memory of the device according to an exemplary embodiment.

FIG. 3 illustrates an example of the configuration of the memory 102 of the apparatus 100 according to an exemplary embodiment.

According to an aspect, a software component which is stored in the memory 102 may include an operating system (OS) 210, a communication module (or an instruction set) 261, a social networking module (or an instruction set) 263, a commerce service module (or an instruction set) 265, a location based service (LBS) module (or an instruction set) 267, an interaction module (or an instruction set) 269, a sensor module (or an instruction set) 271, a graphic module (or an instruction set) 273, a text input module (or an instruction set) 275 and an application (or an instruction set) 220.

According to an aspect, the communication module 261, the social networking module 263, the commerce service module 265, the LBS module 267, the interaction module 269, the sensor module 271, the graphic module 273 or the text input module 275 may be included in the OS 210. For example, the communication module 261, the social networking module 263, the commerce service module 265, the LBS module 267, the interaction module 269, the sensor module 271, the graphic module 273 or the text input module 275 may provide an interface for the application 220 to access hardware or software components, or control a system task relating to the application 220.

According to another aspect, the communication module 261, the social networking module 263, the commerce service module 265, the LBS module 267, the interaction module 269, the sensor module 271, the graphic module 273 or the text input module 275 may be included in the application 220. For example, the communication module 261, the social networking module 263, the commerce service module 265, the LBS module 267, the interaction module 269, the sensor module 271, the graphic module 273 or the text input module 275 may include a driver of a software component and/or hardware component or perform an operation of the software component and/or hardware component in association with the OS 210.

Like an embedded OS such as Darwin, Linux, Unix, OSX, Windows, bada (one of mobile OSs provided by Samsung Electronics, a Korean company) or VxWorks, the OS 210 includes various software components and/or drivers to control and manage general system tasks including memory management, storage device control and power control, and enables a communication between the various hardware and software components.

The OS 210 according to an exemplary embodiment may include layers of a kernel 211, a device 213, a service 215 and a framework 217.

The kernel 211 may include a real-time OS or a Linux kernel based on the hardware of the apparatus 100.

The device 213 may include platform functions of the apparatus 100 provided by a device OS, a graphic and multimedia function and communication components. For example, the platform functions may include telephony, security, graphics, or events and window management.

The service 215 may include service-oriented functions which are provided by application engines and server-assisted components. By the service 215 which includes contact or messaging engines, the application engines may be provided. For example, the server-assisted functions may be provided by web service components which are connected to service components of the bada server. As above, the applications may manage data stored in remote servers, including geographical information or user presence information through the server-assisted functions. The server-assisted functions may be accessed by an Application Programming Interface (API) of the framework 217.

The framework 217 may include an open API framework of bada. The framework 217 may include an application framework as well as interfaces and classes accessing functions of lower layers. The application framework may provide application life cycle management, event handling or an application control function. The interfaces may be provided by the open API framework. The open API framework may include basic interfaces which are necessary for data handling, utilities, basic functions and application status or application generating a graphic user interface. The API framework may include not only interfaces enabling access to services provided by lower layers, but also user interface, or multimedia, communication, internationalization, location, security, commerce or web browsing interfaces.

The communication module 261 enables a communication with other devices through at least one external port 134, and may include various software components to process data received by the RF circuit 131 and/or the external port 134. The external port 134 such as a universal serial bus (USB) or FireWire may be directly connected to other devices or indirectly connected thereto through a network (such as the Internet or wireless LAN).

The social networking module 263 enables a communication with other devices or a network server through the at least one external port 134, and may include various software components to process data received by the RF circuit 131 and/or the external port 134. The social networking module 263 may share user presence information and the like with other application users or manage user profiles in association with the communication module 261. The social networking module 263 may provide an interface for the application 220 to share user presence information with other application users or manage user profiles. Also, the social networking module 263 or an interface of the social networking module 263 may include a mechanism through which application users gather and use a social networking service on the Internet.

The commerce service module 265 enables a communication with other devices or a network server through at least one external port 134, and may include various software components to process data received from the RF circuit 131 and/or the external port 134. The commerce service module 265 may be in association with the communication module 261. The commerce service module 265 may operate for a user to sell or purchase goods (e.g., game items or applications) through a communication network, or provide an interface which supports such operation to the application 220.

The LBS module 267 enables a communication with other devices or a network server through at least one external port 134, and may include various software components to process data received from the RF circuit 131 and/or the external port 134. The LBS module 267 may be in association with the communication module 261. The LBS module 267 may transmit or receive geographical information (e.g., major landmarks, stores, map data or geographical coding services) through a communication network or process geographical information to be provided to a user or a network server. The LBS module 267 may provide the application 220 with an interface including functions using geographical information.

The interaction module 269 may provide a user with a visual, auditory or tactile feedback as a response to a user's motion or touch (or touch gesture), a response to a detect of a user's shape (face or body) or a response to a preset event.

For example, upon receiving a touch from the touch screen 121, the interaction module 269 may include a software component which provides a user with various vibrations patterns as a haptic function to feedback a tactile response depending on contact by touch, release of contact, size of a contact point, speed, acceleration, direction, change of size or change of direction through the another I/O controller 123 and/or a vibration device (not shown) included in the another I/O device 123. The interaction module 269 may provide an effect as if the screen is shaking, together with the graphic module 273 or the display controller 111 to increase the vibration. Upon receiving a new message from the instant messaging module 229 as a preset event, the interaction module 269 may provide a vibration or a visual feedback, together with the another I/O controller 113, a vibration device (not shown), the graphic module 273 or the display controller 111.

If the interaction module 269, together with the sensor controller 112, the optical sensor 122a included in the sensor 122 and/or the sensor module 271, recognizes a user's shape and determines that the recognized user is a user registered with the apparatus 100, it may provide a feedback including a preset sound/voice or preset visual stimulus in association with the audio circuit 132, the graphic module 273 or the display controller 111. The interaction module 269 may provide an interface to enable the application 220 to use the feedback.

The sensor module 271 may process data acquired from the optical sensor 122a, the proximity sensor 122b, the accelerometer 122c, the GPS sensor 122d, the magnetic sensor 122e, the tilt sensor 122f, the ambient sensor 122g or the weather sensor 122h or provide an interface to enable the application 220 to use the foregoing data.

For example, the sensor module 271 may acquire location information of the apparatus 100 by using data received through the GPS sensor 122d, and provide various applications with the location information. The sensor module 271 may provide the telephone module 223 with the location information acquired through the GPS sensor 122d for a location-based call, or provide the camera module 233 and/or blogging module 231 with the information as metadata such as photo/video. The sensor module 271 may provide the map module 243 or an application providing a location-based service such as navigation and/or the LBS module 267 with the location information acquired through the GPS sensor 122d.

The sensor module 271 may provide the weather module 247 with data acquired from the ambient sensor 122g or the weather sensor 122h. The sensor module 271 may provide the graphic module 273 or the display controller 111 with data acquired from the optical sensor 122a to change a brightness of a graphic or adjust a brightness of a backlight of the screen.

The graphic module 273 includes various known software components to render and display a graphic on the touch screen 121, including a component to change a brightness of the displayed graphic. "Graphic" used herein means any voluntary object which is displayed, including a text, a web page, an icon such as a user-interface object including a soft key, a digital image, a video and animation.

The text input module 275 may be a component of the graphic module 273. The text input module 275 may provide a soft keyboard to various applications (e.g., a contact address module 221, an e-mail client module 227, an instant messaging module 229, the blogging module 231, the browser module 241 or other voluntary applications which need a text input) to input a text, or an interface which activates an input module of a physical keyboard (e.g. Qwerty keyboard).

The application 220 may include the following module (or an instruction set) or a subset or superset thereof: the contact address module 221 (also referred to as address book or contact point); the telephone module 223, the video conference module 225, the e-mail client module 227, the instant messaging (IM) module 229, the blogging module 231, the camera module 233 for still and/or video images, an image management module 235, a video player module, a music player module, or a video/music player module 237 integrating the video player module and the music player module, a note module 239, the browsing module 241, a map module 243, a calendar module 245, the weather module 247, a stock module 249, a calculator module 251, an alarm clock module 253, a dictionary module 255, a search module 257 or a news module.

The memory 102 may include a word processing module, a JAVA module, an encoding module, a digital authority management module, a voice recognition module or a voice replication module as the application 220.

The contact address module 221 may be used to manage an address book or contact address together with the touch screen 121, the display controller 111, the interaction module 269, the graphic module 273 and/or the text input module 275. For example, the contact address module 221 may add names on the address book, delete names from the address book, connect telephone number, e-mail address, physical address or other information with names, connect name and image, classify or sort names, initiate communication by the telephone module 223, the video conference module 225, the e-mail client module 227 or the IM module 227 or provide telephone number or e-mail address to enable the initiation of communication.

The telephone module 223 may operate together with the RF circuit 131, the audio circuit 132, the touch screen 121, the display controller 111, the interaction module 269, the graphic module 273 and/or the text input module 275. For example, the telephone module 223 may input characters corresponding to telephone number, access at least one of telephone numbers of the contact address module 221, revise the input telephone number, dial each telephone number, perform dialog or release connection or hang up if the dialog is over. As described above, wireless communication may employ any of a plurality of communication standards, protocols and technologies.

The video conference module 225 may initiate, perform and end a video conference between a user and at least one conference attendee together with the RF circuit 131, the audio circuit 132, the touch screen 121, the display controller 111, the optical sensor 122a, the sensor controller 112, the interaction module 269, the graphic module 273, the text input module 275, the contact address module 221 and/or the telephone module 223.

The e-mail client module 227 may generate, transmit, receive and manage e-mail together with the RF circuit 131, the touch screen 121, the display controller 111, the interaction module 269, the graphic module 273 and/or the text input module 275. The email client module 227 may generate, transmit and receive e-mail including still or video images acquired through the image management module 235 and/or the camera module 233.

The IM module 229 may operate together with the RF circuit 131, the touch screen 121, the display controller 111, the interaction module 269, the graphic module 273 and/or the text input module 275. For example, the IM module 229 may input characters corresponding to an instant message, revise the input character, transmit and receive each instant message. The transmitted and/or received instant message may include a graphic, a photo, an audio file, a video file and/or other attachment supported by an MMS and/or Enhanced Messaging Service (EMS). "Instant messaging" used herein may refer to both a telephone-based message such as a message transmitted through SMS or MMS and an Internet-based message such as a message transmitted through XMPP, SIMPLE or IMPS.

The blogging module 231 may transmit to or receive from a blog (e.g. a user's blog) a text, a still image, a video, and/or other graphics together with the RF circuit 131, the touch screen 121, the display controller 111, the interaction module 269, the graphic module 273, the text input module 275, the image management module 235, the browsing module 241 and/or the social networking module 263.

The camera module 233 may operate together with the touch screen 121, the display controller 111, the optical sensor 122a, the sensor controller 112, the interaction module 269, the graphic module 273 and/or the image management module 235. For example, the camera module 233 may capture a video including a still image or a video stream to store them in the memory 102, modify the property of the still image or the video or delete such still image or video from the memory 102.

The image management module 235 may operate together with the touch screen 121, the display controller 111, the interaction module 269, the graphic module 273, the text input module 275 and/or the camera module 233. For example, the image management module 235 may arrange, modify, manipulate, label or delete a still image and/or video image or display and store such still image and/or video image as a digital slide show or an album.

The video/music player module 237 may include a video player module. The video player module may display a video on the touch screen 121 or an external display connected through the external port 134, or play such video, together with the touch screen 121, the display controller 111, the interaction module 269, the graphic module 273, the RF circuit 131 and/or the audio circuit 132.

The video/music player module 237 may include a music player module. The music player module may play music stored and recorded in at least one file format including MP3, wma and AAC file and other sound files, together with the touch screen 121, the display controller 111, the interaction module 269, the graphic module 273, the audio circuit 132, the RF circuit 131 and/or the browsing module 241.

The note module 239 may generate and manage a note or a to-do list, together with the touch screen 121, the display controller 111, the interaction module 269, the graphic module 273 and/or the text input module 275.

The browsing module 241 may perform the Internet browsing including searching, linking, receiving and displaying a web page or a part of the web page and an attachment linked to the web page and other files, together with the RF circuit 131, the touch screen 121, the display controller 111, the interaction module 269, the graphic module 273 and/or the text input module 275.

The map module 243 may receive, display, modify or store data on, e.g., driving direction, stores in a particular location or adjacent stores and relevant sites, location-based data and other map-related data and maps, together with the RF circuit 131, the touch screen 121, the display controller 111, the interaction module 269, the graphic module 273, the text input module 275, the sensor module 271, the LBS module 267 and/or the browsing module 241.

The calendar module 245 may generate, display and store a calendar and relevant data (e.g., calendar entry, and a to-do list), together with the RF circuit 131, the touch screen 121, the display controller 111, the interaction module 269, the graphic module 273 and/or the text input module 275.

The weather module 247, the stock module 249, the calculator module 251, the alarm clock module 253 and/or the dictionary module 255 may operate together with the RF circuit 131, the touch screen 121, the display controller 111, the interaction module 269, the graphic module 273, the text input module 275, the communication module 261, the sensor module 271 and/or the browsing module 241. The foregoing modules may be applications which provide weather information, stock information, or calculator, alarm clock or dictionary function.

The search module 257 may search a text, music, sound, image, video and/or other files stored in the memory 102 and matching at least one search condition such as at least one search word designated by a user, together with the touch screen 121, the display controller 111, the interaction module 269, the graphic module 273 and/or the text input module 275.

The news module 259 may operate together with the touch screen 121, the display controller 111, the interaction module 269, the graphic module 273, the RF circuit 131, the communication module 261, the social networking module 263 and/or the text input module 275. For example, the news module 259 may receive a web address designated by a user, a network address, an html, xml, RSS file including news channel/articles or a text about a blog or images or Digital Rights Management (DRM) files and other data in the network or of an external device, or download such data from the network or the external device to the memory 102 and provide a user with such data.

The foregoing modules and applications may correspond to an instruction set to perform at least one of the functions described above. Such modules (i.e., an instruction set) do not need to be realized as an individual software program, procedure or module, and various subsets of such modules may be integrated or rearranged according to various exemplary embodiments. For example, the video/music player module 237 may be a single module or may be classified into a video player module and a music player module. According to some exemplary embodiments, the memory 102 may store therein the foregoing modules and the subset of a data configuration. The memory 102 may further store modules and data configuration which are not described above.

Figure 4:
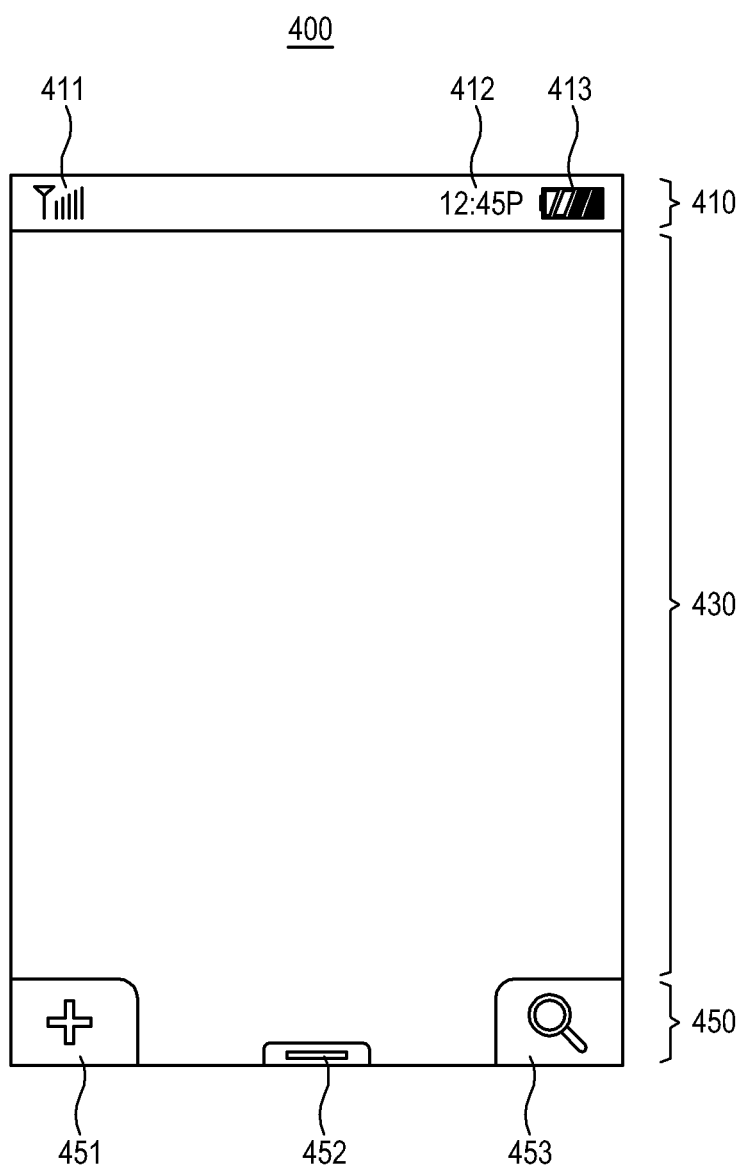
FIG. 4 illustrates an example of a screen configuration of the device which includes the touch screen according to an exemplary embodiment.

FIG. 4 illustrates an example of a screen configuration of the apparatus 100 which includes the touch screen 121 according to an exemplary embodiment.

According to an aspect, an area of the screen 400 may include a status area 410, a main area 430 and a command area 450.

The status area 410 may be provided in an upper part of the touch screen 121 and provide information relating the status of the apparatus 100. For example, the status information may include connection information and system/event information. The connection information may include an icon (or graphic) relating to a signal intensity 411, Wi-Fi connection, Bluetooth connection and call connection. The system/event information may include an icon (or graphic) relating to time 412, a residual amount level of a battery 413, applications on execution (execution of music or radio), reception of message, profile and alarm setting. Such icons may have priority and may be sequentially provided in a left or right side on the status area 410 according to the priority. According to an aspect, an icon which has a lower priority may be hidden while an icon which has a higher priority may be displayed always.

On the main area 430, at least one content which accounts for most of the touch screen 121 and provided by the apparatus 100 may be displayed. In an upper part of the main area 430, information relating to at least one content or a UI relating to at least one content may be provided. For example, the content-related information may include a title of a content, a command name which is executed in a previous screen, a name or location of a category which includes a currently-displayed content. The content-related UI may include a tab or folder to move to another content at the same level as the content. According to an aspect, if at least one content is scrolled on the main area 430, the content-related information or content-related UI provided in an upper side of the main area 430 may hold its location on the main area 430 regardless of a scroll gesture.

The command area 450 may be provided in a lower part of the touch screen 121, and provide, e.g., a UI such as at least one of soft keys 451 and 453 and an option menu 452. According to an aspect, the command area 450 may be used as a part of the main area 430 usually, and provide the soft keys 451 and 453 or the option menu 452 depending on circumstances (e.g. when a user contacts, moves or releases such contact). The soft keys 451 and 453 may be provided to perform useful functions relating to an application on execution. For example, the soft keys 451 and 453 may include a search function, a function returning to a previous screen, a function canceling an operation being executed and a function adding a new category. The soft keys 451 and 453 may be provided in a left side or right side of the command area 450 and include at least one key in proportion to the number of available functions. The soft keys 451 and 453 may include various graphics, e.g. icons and texts which are intuitive and easy to understand. The option menu 452 may provide an option with respect to a content displayed on the main area 450 or to an application being executed. For example, if a user selects the option menu 452, the option menu 452 may provide a soft keyboard having at least one symbol displayed on the main area 430 or at least one available function or detailed information of contents on the main area 430.

The apparatus 100 may include at least one physical UI together with the virtual UI. According to an aspect, the apparatus 100 may include a power/lock button, a home button, a volume up button and a volume down button. The power/lock button may lock or unlock the apparatus or turn on or off the apparatus 100 when pressed long. The home button may be navigated by a voluntary application of an application set executable in the apparatus 100 (e.g., main page application). The volume up button and the volume down button may increase and decrease volume, respectively. According to another exemplary embodiment, the apparatus 100 may further include a send button, a camera button and an end button. The send button may display a telephone log or connect the latest received telephone call when pressed long. The camera button may photograph by executing a camera application or using the optical sensor 122a of the apparatus 100. The end button may end a currently executed application and return to the main page, or end a call connection when a user is on the phone. A set of functions corresponding to the foregoing button may be performed by using the same physical button, or functions corresponding to a single button may be distributed and performed by different physical buttons. The function of the physical button may be realized as a virtual button on the touch screen 121. According to another exemplary embodiment, the apparatus 100 may receive a verbal input through the audio circuit 132 as a physical UI to enable or disable some functions.

Hereinafter, an example of a screen configuration including the command area in the apparatus 100 according to an exemplary embodiment will be described with reference to FIGS. 4 to 9.

The command area 450 in FIG. 4 may include an area overlaying the main area 430. For example, the main area 430 may take the whole or a part of the screen 400. For example, if the apparatus 100 operates in an entire screen mode, the status area 410 may be hidden and the entire area displayed on the screen 400 may replace the main area 430. The command area 450 which includes at least one of the soft keys 451 and 453 and/or the option menu 453 may overlay the area of the screen 400 excluding the status area 410. The display controller 111 in FIG. 1 may control the at least one of soft keys 451 and 453 and/or the option menu 453 to overlay the main menu 430 or an application displayed on the main area 430. The memory 102 in FIG. 3 may maintain the application 220 driving the at least one of soft keys 451 and 453 and/or the option menu 453 or software modules 261 to 275. For example, the at least one of soft keys 451 and 453 may be components operating together with the API of the OS 210, at least one of applications 220, the touch screen 121, the display controller 111, the graphic module 273 and/or the interaction module 269. The apparatus 100 may detect an occurrence of a preset event through the soft keys 451 and 453 or perform an operation corresponding to the occurrence of the event.

The command area 450 may include at least one of soft keys 451 and 453 and/or the option menu 452. The soft keys 451 and 453 may correspond to the M number of option (s) among the N number of options in a menu of the application displayed on the main menu 430 (e.g., one of the applications 220 in FIG. 3). The display controller 111 may control the soft keys 451 and 453 to overlay the main area 430 or the application displayed on the main area 430. N and M are integer, and M is the same as or smaller than N. For example, if M is 2, two of the options of the applications may map the soft keys 451 and 453.

If N is larger than M, the option menu 452 may be displayed. As a response to a touch gesture of a user selecting the option menu 452, the option menu 452 may provide a UI to display on the screen 400 of the apparatus 100 a window including the 'N-M' number of options that are not included in the M number of option(s) among the N number of options.

The M number of soft keys 451 and 453 may be provided in lower left and right sides of the screen 400, and labeled as at least one of icons and text displaying the M number of options. For example, the soft key 451 may be provided in a lower left side of the screen 40 and display a function of adding contents or items. The soft key 451 may include a "+" icon or graphic displaying addition. The soft key 453 may be provided in a lower right side of the screen 400 and display a search function. The soft key 453 may include a "magnifying glass" icon or graphic displaying a search function. The option menu 452 may be provided between the lower left side and the lower right side, and take a smaller area than the M number of soft keys 451 and 453.

Referring to FIGS. 5 and 6, an example of a screen configuration including soft keys in the apparatus 100 according to an exemplary embodiment will be described.

Figure 5A:
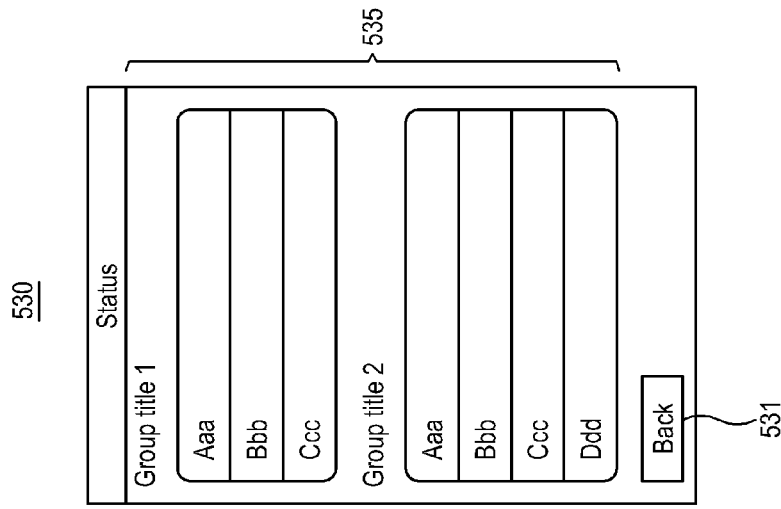
FIGS. 5A, 5B, and 5C illustrate an example of a screen configuration which includes a soft key in the apparatus according to an exemplary embodiment.
Figure 5B:
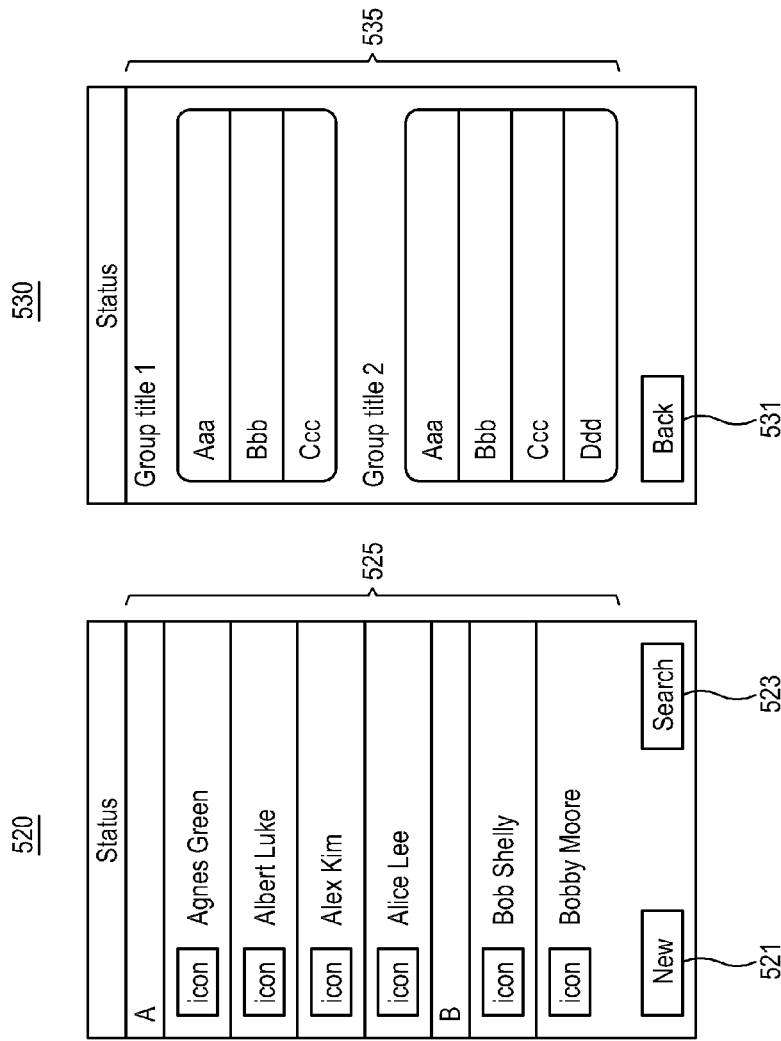
Figure 5C:
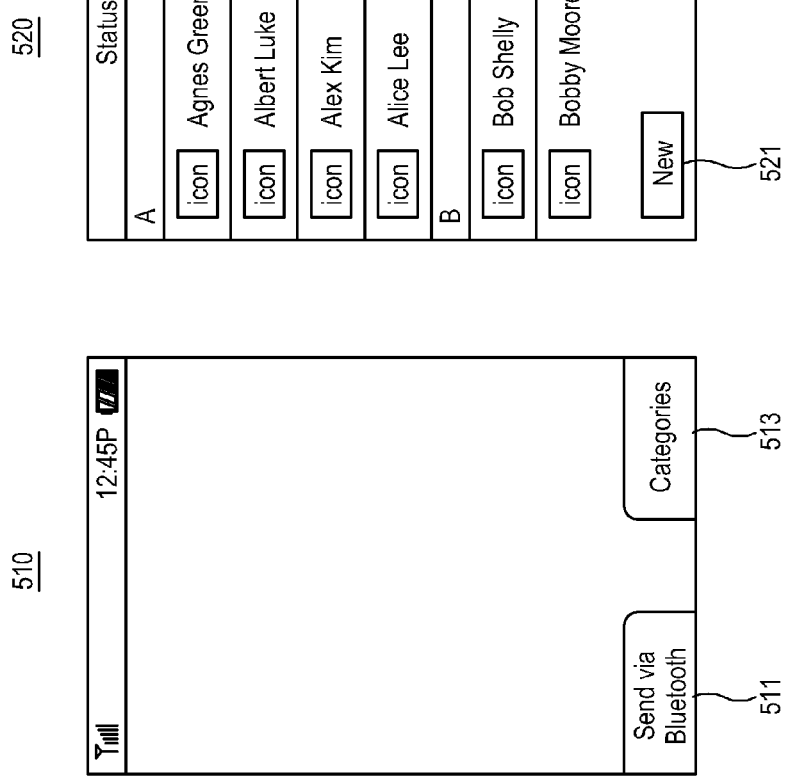

A screen 510, a screen 520 or a screen 530 in FIGS. 5A, 5B, and 5C is an example of a screen configuration displayed on the apparatus 100.

A soft key 511 of the screen 510 may display a function transmitting through Bluetooth. The soft key 511 may include 'Send via Bluethooth' as a text or graphic displaying the foregoing transmission function. The soft key 513 may display a genre-selecting function. The soft key 513 may include 'Categories' as a text or graphic displaying a genre.

A main area 525 of the screen 520 may include a display of the contact address module 221 in FIG. 3 as an example. The soft key 521 may display a function of adding a new item. That is, the soft key 521 may display a function that adds a new contact address to the contact list. The soft key 421 may include 'New' as a text or graphic displaying the function of adding the new item. The soft key 523 may display a contact address searching function. If the soft key 523 is selected, the search function of the contact address module 221 may be performed or the search module 257 may be in association therewith. The soft key 523 may include 'Search' as a text or graphic displaying the search function.

The main area 535 of the screen 530 may include a display of a user setting of the text input module 275 in FIG. 3 as an example. For example, the user setting of the text input module 275 may provide a UI to display a current setting such as a font, and a font size or change the setting. If a menu of the application (e.g., the text input module 275) has one option, the soft key may be a single key. For example, the soft key 531 may display a return function to navigate a menu. That is, the soft key 531 may receive an input to change to another setting screen, change to a screen of another application or to return to a previous screen. The soft key 531 may include 'Back' as a text or graphic displaying a new, return function.

A main area 615 of a screen 610 in FIG. 6A may include a display of a text 619 which is input through a soft keyboard 617 of the text input module 275 in FIG. 3 as an example. The soft key 611 may display a storage function to store a text as a file. The soft key 611 may include 'Save' as a text or graphic displaying the storage function. The soft key 613 may display a function of deleting the text 619 temporarily stored in the memory 102 in FIG. 1 or a function of canceling an inputting a text or a storage of a file corresponding to the text. The soft key 613 may include 'Cancel' as a text or graphic displaying the cancel function.

The main area 625 of the screen 620 in FIG. 6B may include a display of a particular application driven together with the text input module 275 to receive a password. The soft key 621 may display a completion of input of a text 629. Considering security of the password, "*" or '.' may be displayed when the password is input. If the soft key 621 is selected, the text 629 may be transmitted as an input value of the particular application. The soft key 621 may include 'Done' as a text or graphic displaying a completion of input function. The soft key 623 may display a function of deleting the text 629 temporarily stored in the memory 102 in FIG. 1 or canceling the input of the text 629. The soft key 623 may include 'Cancel' as a text or graphic displaying the cancel function.

Figure 7:
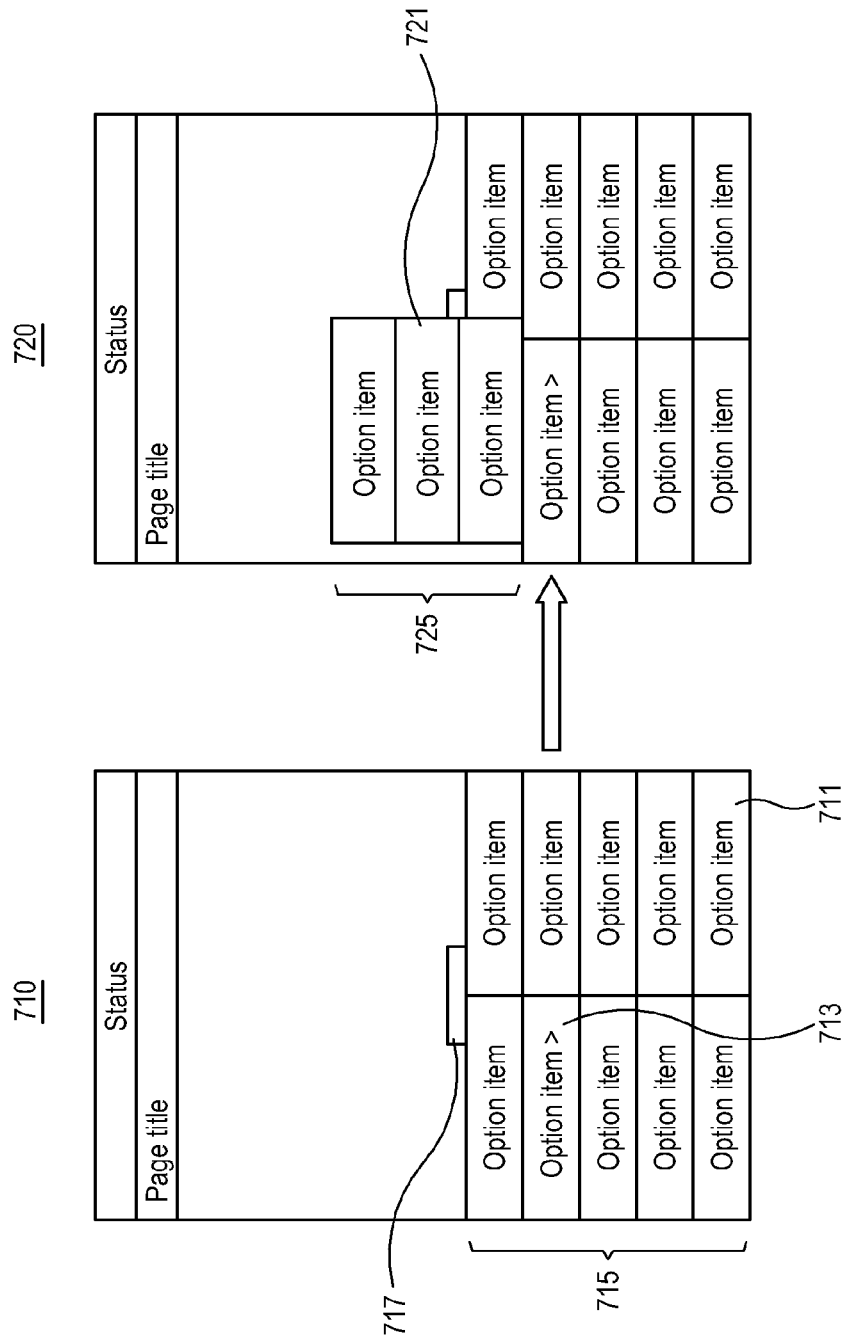
FIG. 7 illustrates an example of a screen configuration with respect to an option menu in the apparatus according to an exemplary embodiment.
Figure 8:
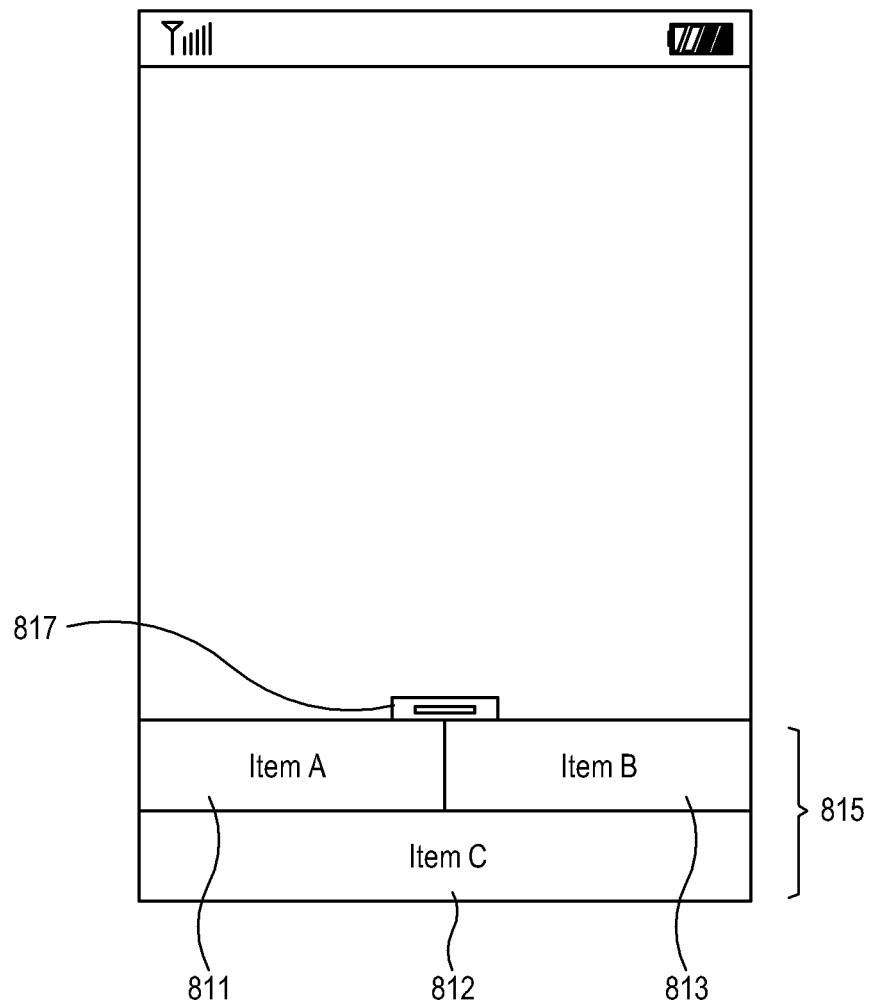
FIG. 8 illustrates an example of a screen configuration with respect to an option menu in the apparatus according to an exemplary embodiment.
Figure 9:
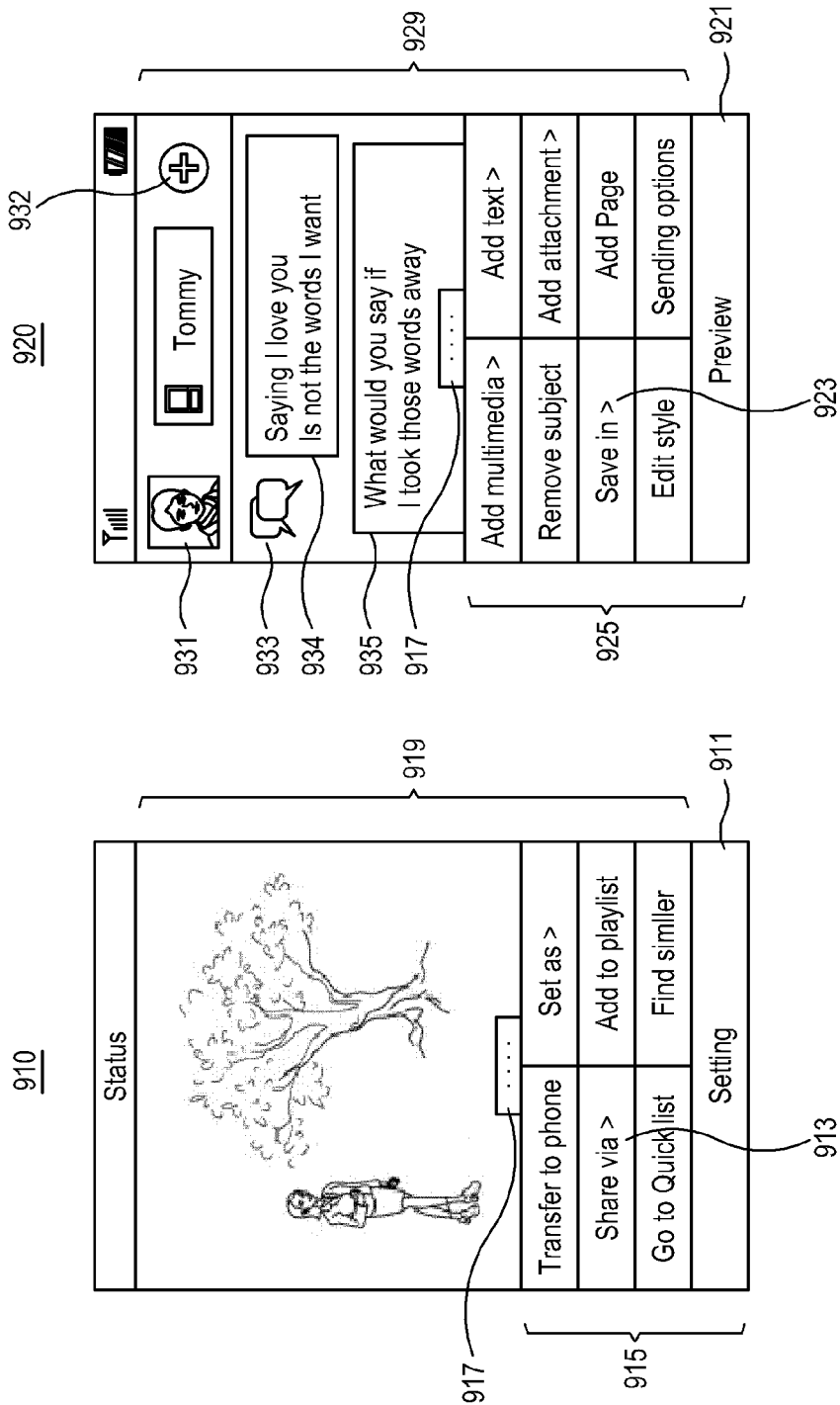
FIGS. 9A and 9B illustrate an example of a screen configuration with respect to an option menu in the apparatus according to an exemplary embodiment.

Referring to FIGS. 7 to 9, an example of a screen configuration of the option menu in the apparatus 100 according to an exemplary embodiment will be described.

A screen 710 in FIG. 7 may display a window 715 including options, as a response to a touch gesture of a user selecting the option menu 452 in FIG. 4. For example, if the option menu 452 is selected through a touch gesture such as tap, swipe or drag, a graphic 717 displaying the option menu 452 may be displayed together with the window 715. Each option may map the item 711 and be displayed. If the item 711 further includes a subordinate option 721, a symbol 713 displaying a view of options subordinate to the item may be added. If the symbol 713 is selected, a popup window 725 including the item 721 displaying the subordinate options may be displayed on the screen 720.

A screen 810 in FIG. 8 may include a window 815 including items 811, 812 and 813 mapping options, as a response to the selection of the option menu 817. An area of the item 811 or 813 may be different in size from an area of the item 812. A displaying method of the window 815 on the screen may include a visual effect as if the window 815 soars upward from the bottom of the screen.

A main area 919 of a screen 910 in FIG. 9A may include a display of an application (e.g., the video/music player module 237 in FIG. 3). The screen 910 may include a display of a window 915 including an item 911 mapping an option, as a response to the selection of the option menu 917. If the item 911 further includes a subordinate option, a symbol 913 which displays viewing options subordinate to the item may be added.

A main area 929 of a screen 920 in FIG. 9B may include a display of an application (e.g., the IM module 229, the blogging module 231 or the real-time messaging module (not shown) in FIG. 3). The real-time messaging module may operate together with the RF circuit 131, the touch screen 121, the display controller 111, the interaction module 269, the graphic module 273 and/or the text input module 275. The real-time messaging module may provide an interface to transmit and receive multimedia data including a text in real-time between a user and a counterpart. For example, the real-time messaging module may include an information display area 931 of a counterpart, a contact add icon 932, an icon displaying a received message 933, a frame 934 displaying a received message, and a frame 935 preparing/displaying a message to be sent to a counterpart. The screen 910 may include a display of a window 925 including an item 921 mapping an option, as a response to the selection of the option menu 917. If the item 921 further includes a subordinate option, a symbol 923 displaying a view of an option subordinate to the item may be displayed additionally.

Figure 10:
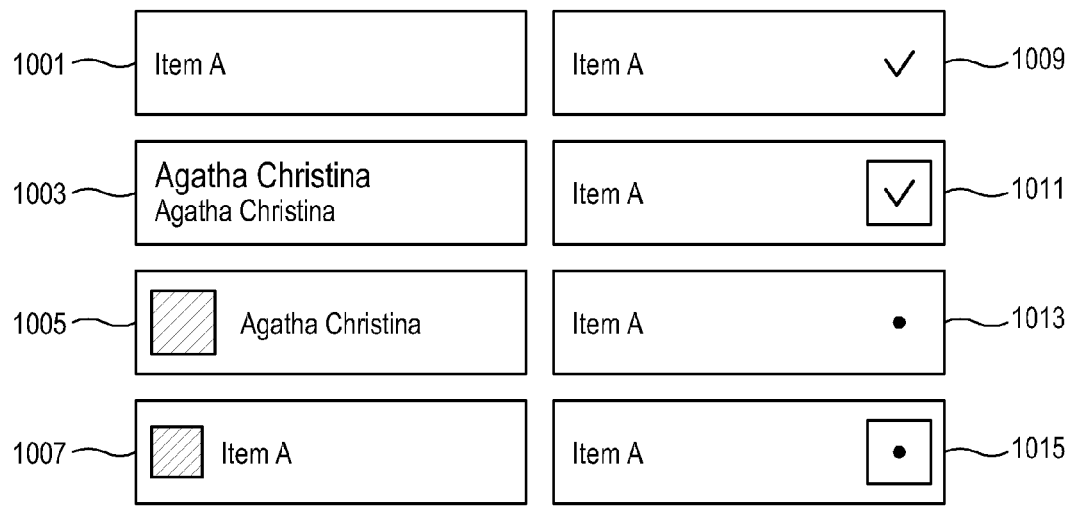
FIG. 10 illustrates an example of a screen configuration with respect to an item of a list in the apparatus according to an exemplary embodiment.

FIG. 10 illustrates an example of a screen configuration of an item which is included in a list in the apparatus 100 according to an exemplary embodiment.

An item 1001 or 1003 of the list may include a name of the item or information of the item. The name or information of the item may be displayed as a text or graphic. An item 1005 or 1007 may include an icon or image of an item. An item 1009 or 1011 may include a check box displaying selection/non-selection of the item. A boundary of an area displaying the name of the item and the area displaying the check box and a boundary of an area displaying different responses to a touch gesture in the area of the item may be displayed additionally in the area of the item 1011. An item 1013 or 1015 may include a radio button displaying selection/non-selection of the item or selection/non-selection of one of a particular item group.

Hereinafter, an example of a screen configuration of a list in the apparatus 100 according to an exemplary embodiment will be described with reference to FIGS. 11 to 15.

The memory 102 in FIG. 1 may maintain types of a list available in the apparatus 100. The types of the list may include a basic type by which a plurality of items is arranged sequentially in the list, a grouping type by which a plurality of items are grouped and arranged according to a preset classification standard in the list and/or an expandable type by which additional information or subordinate items with respect to the selected items of the plurality of items are inserted to the list of the plurality of items. The memory 102 may maintain an application which drives the list. The list driving the application may include the types of the list.

The processor 101 may detect the type of the list included in the application. The display controller 111 may receive from the memory 102 a display control method corresponding to the detected type of the list among the types of the list, and display the list on the screen by the received method. As the type of the list is used in the apparatus 100, a program developer may develop an application including the list more conveniently. As an operation or control function relating to the type of the list is optimized, the apparatus 100 may provide a reliable interface that may operate without failure.

Figure 11:
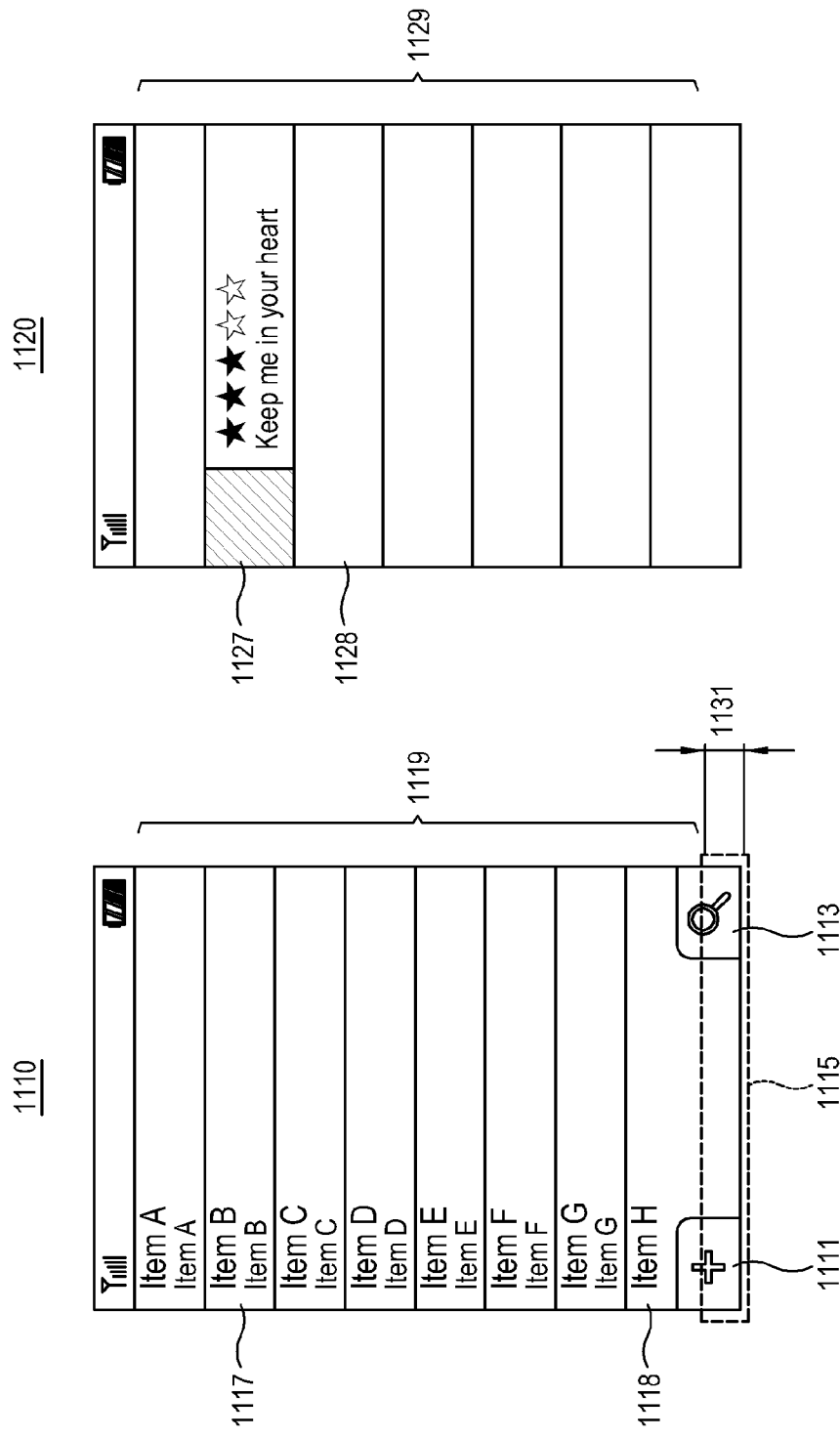
FIGS. 11A and 11B illustrate an example of a screen configuration with respect to a basic list in the apparatus according to an exemplary embodiment.
Figure 12:
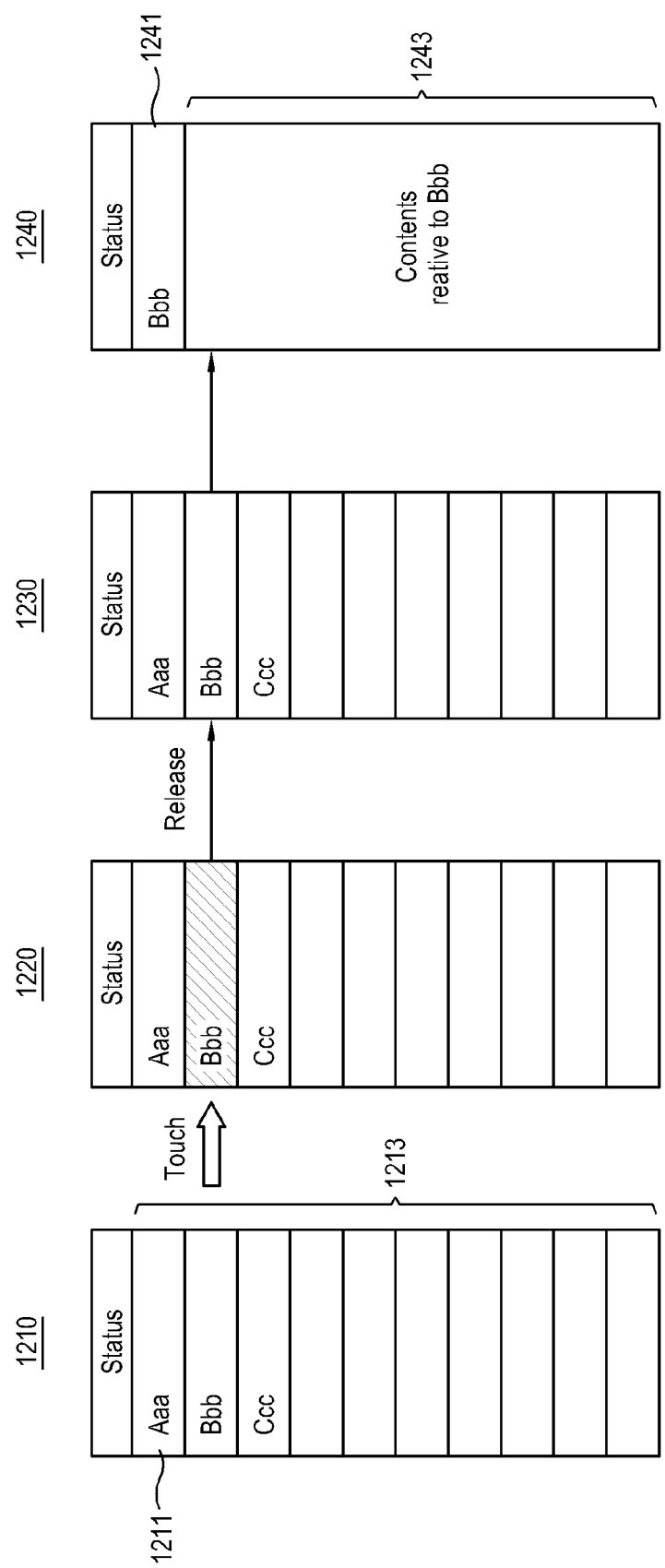
FIG. 12 illustrates an example of a screen configuration with respect to a basic list in the apparatus according to an exemplary embodiment.
Figure 13:
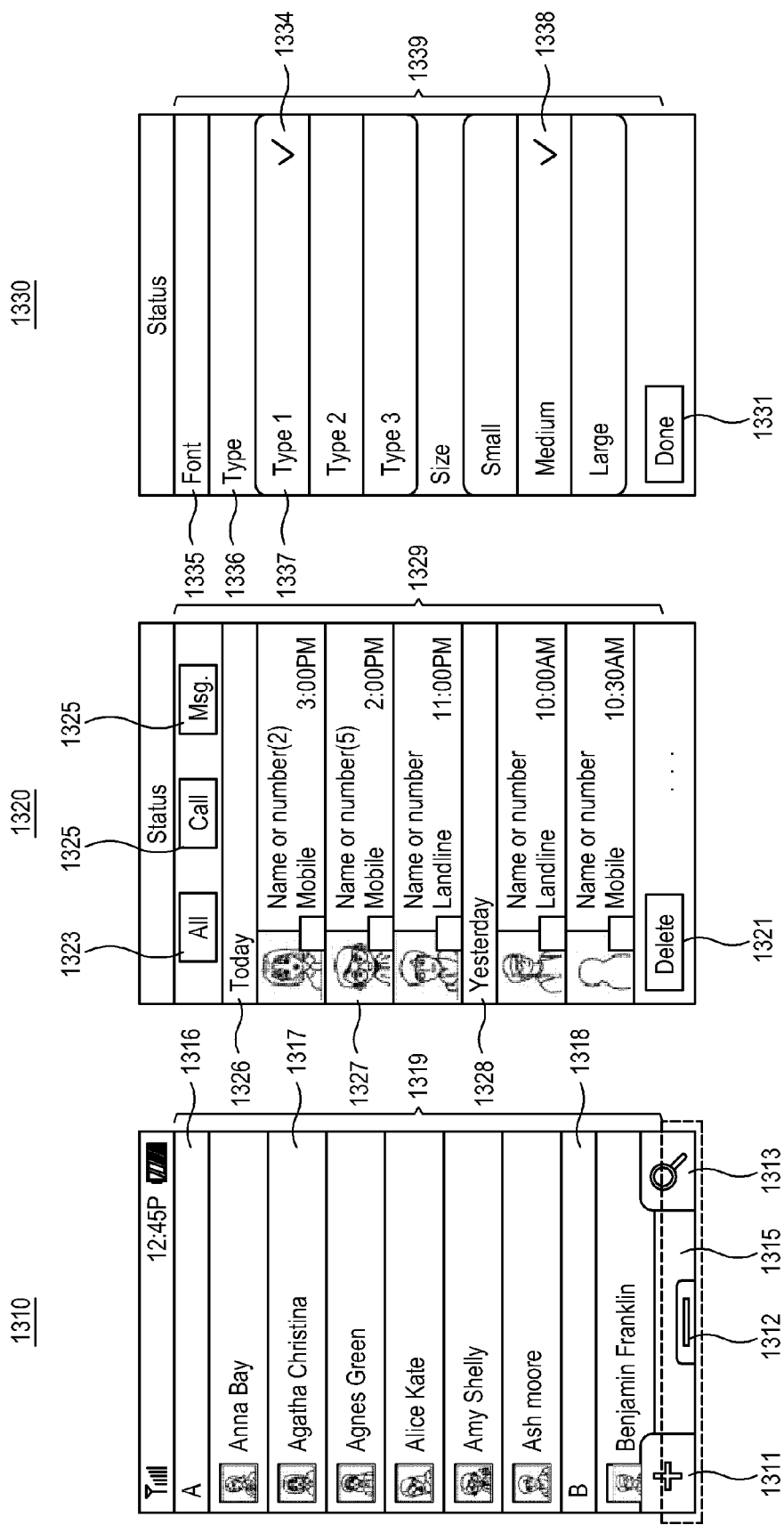
FIGS. 13A, 13B, and 13C illustrate an example of a screen configuration with respect to a grouping list in the apparatus according to an exemplary embodiment.

FIGS. 11 and 12 illustrate an example of a screen configuration of a basic list in the apparatus 100 according to an exemplary embodiment.

A screen 1110 in FIG. 11A may include a main area 1119 displaying a list, and soft keys 1111 and 1113. The screen 1110 which displays the list thereon may be divided into a plurality of areas, and the item 1117 may be provided in each of the plurality of areas. The basic list may arrange a plurality of items in the preset order in the area of the list.

If a plurality of items of the list overlays the M number of soft keys 1111 and 1113, the display controller 1111 in FIG. 1 may insert a dummy area 1115 in a preset size to one of an upper part and a lower part of the item 1118 corresponding to the overlaying area and move a location of the item 1118 corresponding to the overlapping area on the screen 1110. Then, a user may identify information of the item 1118 conveniently. A height 1131 of the dummy area 1115 may be a height of the item 1117 or a height of the option menu 452 in FIG. 4. The height 1131 of the area 1115 may be a value of zero or more or one or less of the item 1117 or zero or more or up to the height of the soft keys 1111 and 1113. As the dummy area 1115 is inserted, the height (or width) of the area of the items of the list may be adjusted. For example, as the display area of the list is reduced as much as the height 1131, the height of the item 1117 may be reduced partially.

If at least a part of the area of the items 1118 among the area of the plurality of items is covered by the M number of soft keys 1111 and 1113, the processor 101 may determine whether to select the item, as a response to a touch gesture in an area excluding the area of the M number of soft keys 1111 and 1113 in the area of the item 1118. As above, even if the touch screen 121 of the apparatus 100 has a small screen 1110, the apparatus 100 may provide an interface to more efficiently utilize the area of the screen 1110.

If a screen 1120 illustrated in FIG. 11B does not include a soft key, it may include a main area 1129 which is filled with a list excluding a status area. The screen which displays thereon the list may be divided into a plurality of areas, and the item 1127 may be provided in each of the plurality of areas. The list may include an empty area 1128 which does not include item information.

In a screen 1210 in FIG. 12, a basic list which is included in a main area 1213 may be divided into a plurality of areas and may include an item 1211. As a response to a touch gesture in an area of the item 1211, the item 1211 may be enabled (or highlighted) and displayed on the screen 1220. If the touch gesture is distant from the touch screen 121 in FIG. 1 or far from the touch screen 121 at a predetermined distance, the item 1211 may be disabled (or unhighlighted) and displayed on the screen 1230. If a touch gesture occurs within an area of the item 1211, the screen 1240 may display thereon a name 1241 and/or a content 1243 of the item 1211. The screen 1240 may be displayed following the display of the screen 1220 or the screen 1230.

FIGS. 13A, 13B, and 13C illustrate examples of a screen configuration of a grouping list in the apparatus 100 according to an exemplary embodiment.

A screen 1310 may include a main area 1319 displaying the grouping list, soft keys 1311 and 1313, an option menu 1312 and/or a dummy area 1315. An application which corresponds to the main area 1319 may include, e.g., the contact address module 223 in FIG. 3. The grouping list may display a plurality of items grouped and arranged according to a preset classification standard. For example, the grouping list which is driven in the contact address module 223 may include a display of the group 1316 and/or a display of the group 1318 in the alphabetical order of item information. The display of the group 1316 or 1318 may be provided at the head of items including the item 1217 within the scope of the concerned group.

A screen 1320 may include a main area 1329 and/or a soft key 1321 displaying the grouping list. An application which corresponds to the main area 1329 may include, e.g., the contact address module 223 in FIG. 3 or an integrated communication description module (not shown). The integrated communication description module may include a telephone tab 1324 displaying a call description using the telephone module 223, a message tab 1325 displaying a message exchange description using the IM module 229, and/or an all tab 1323 displaying all of the call description and the message exchange description. For example, the grouping list which is driven in the integrated communication description module may include a display of a group 1326 and/or a display of a group 1328 according to received and transmitted messages or date of telephone call. The display of the group 1326, i.e., an item 1327 which may include counterpart information corresponding to the transmitted or received message or telephone call according to the date "today" may be arranged below the display of the group 1326. The counterpart information may include an identification symbol to identify transmission and reception, or an identification symbol to identity a message and a telephone call.

A screen 1330 may include a main area 1339 displaying the grouping list and/or a soft key 1331. An application which is displayed in the main area 1339 may include, e.g., the text input module 275 in FIG. 3. The text input module 275 may provide a UI to display a current setting of a font 1335 a type 1336 and a letter size 1338, or to change the setting. A check box 1334 may display an item 1337 of the group of the type 1336 set as a current type.

Figure 14:
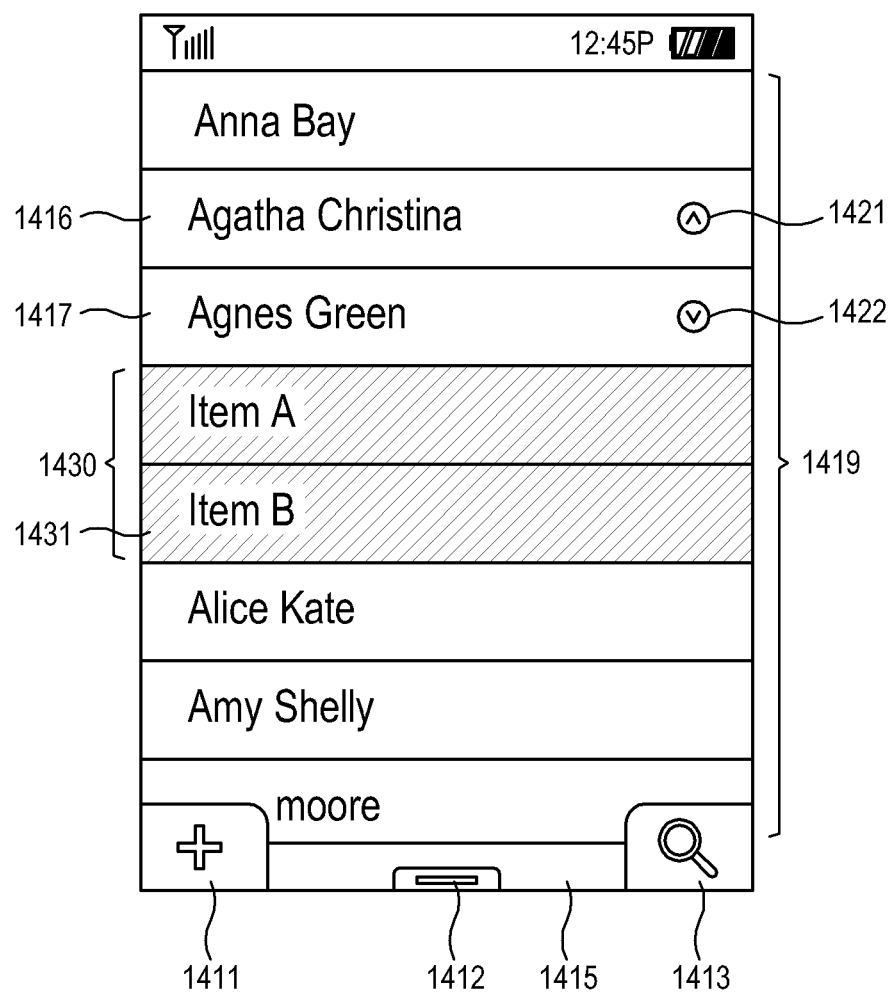
FIG. 14 illustrates an example of a screen configuration with respect to an expandable list in the apparatus according to an exemplary embodiment.
Figure 15:
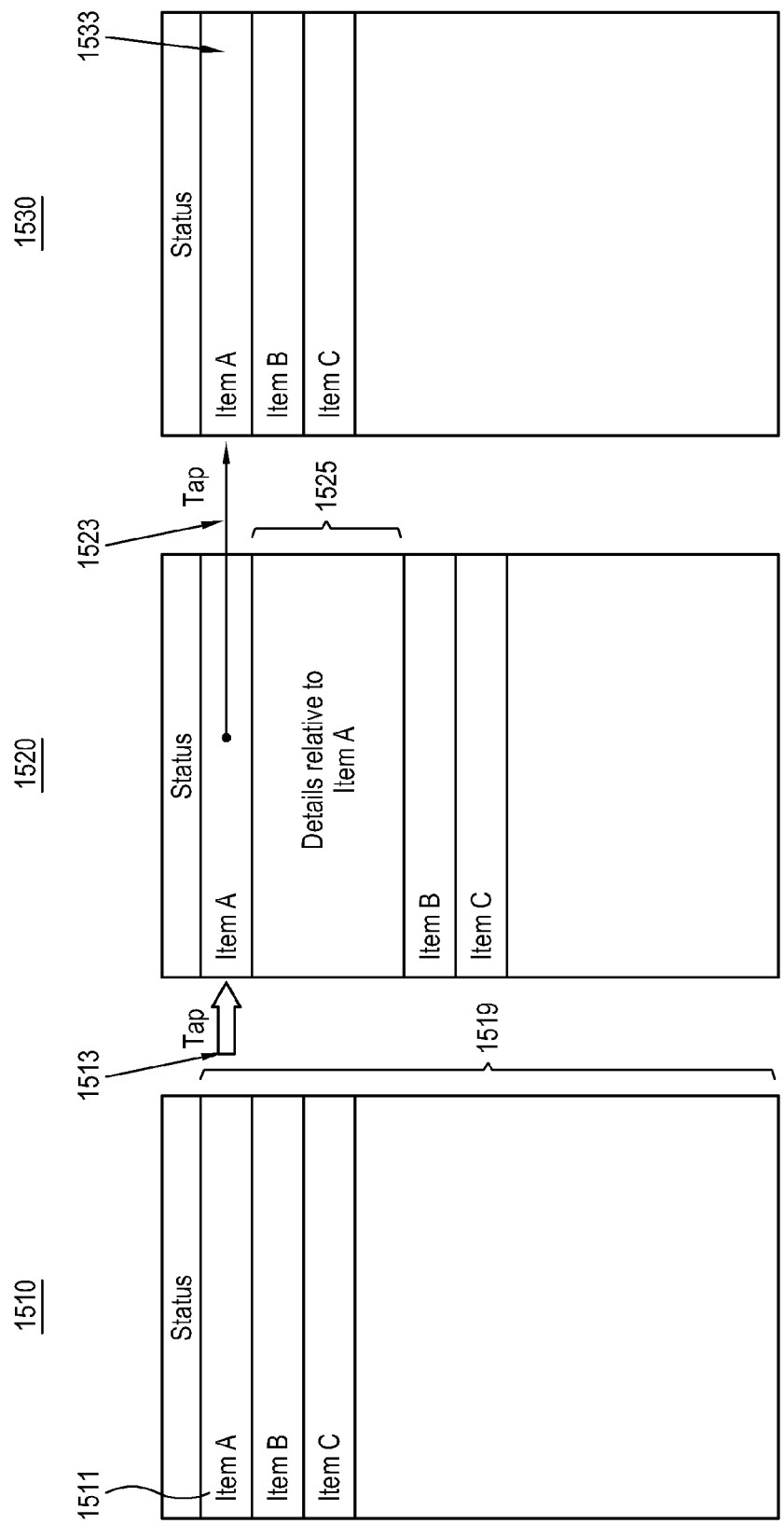
FIG. 15 illustrates an example of a screen configuration with respect to an expandable list in the apparatus according to an exemplary embodiment.
Figure 16:
FIGS. 16A and 16B illustrate an example of a screen configuration with respect to a list including an operation progress status in the apparatus according to an exemplary embodiment.

FIGS. 14 and 15 illustrate an example of a screen configuration of an expandable list in the apparatus 100 according to an exemplary embodiment.

A screen 1400 in FIG. 14 may include a main area 1419 displaying an expandable list, soft keys 1411 and 1413, an option menu 1412 and/or a dummy area 1415. An application which corresponds to the main area 1419 may include the contact address module 223 in FIG. 3. The expandable list may refer to a list into which an area 1430 including additional information or a subordinate item 1431 of an item 1416 and an item 1417 selected among a plurality of items including an item 1317 is inserted. If the item 1416 or 1417 includes additional information or subordinate items to be stated in the expandable list, a symbol 1421 or 1422 may be added to the item 1416 or 1417. The symbol 1422 of the selected item 1417 may be different from the symbol 1421 of the non-selected item 1417.

In a screen 1510 in FIG. 15, an expandable list of a main area 1519 may be divided into a plurality of areas, and include an item 1511. The item 1511 may include a symbol 1513 displaying additional information or a subordinate item. As a response to a touch gesture of the item 1511, the additional information or the subordinate item 1525 of the item 1511 may be displayed in a lower side of the item 1511 on the screen 1520 as if unfold. The item 1511 may include a symbol 1523 different from the symbol 1513. As a response to a touch gesture of the item 1511 on the screen 1520, the additional information or the subordinate item 1525 of the item 1511 may disappear from the screen 1530, and a symbol 1533 which is the same as the symbol 1513 on the screen 1510 may be displayed for the item 1511

Hereinafter, an example of a screen configuration of a list including an operation progress status in the apparatus 100 according to an exemplary embodiment will be described with reference to FIGS. 16 to 19.

A list including the operation progress status may be driven in each of available lists in the apparatus 100. The list including the operation progress status may also be driven regardless of the type of the list. For example, an application, a software module or an interface displaying an operation progress status of at least one item of the list is provided, the list including the operation progress status may be driven.

A screen 1610 in FIG. 16A may include a main area 1620 displaying an application driving the list, software keys 1611 and 1613, an option menu 1612 and/or a dummy area 1615. The application, which drives the list, may include, e.g., the news module 259 in FIG. 3. The news module 259 may operate together with the touch screen 121, the display controller 111, the interaction module 269, the graphic module 273, the RF circuit 131, the communication module 261, the social networking module 263 and/or the text input module 275.

For example, the memory 102 in FIG. 3 may maintain an application (e.g., the news module 259) which drives the list of a plurality of items. The screen 1610 which displays the list thereon may be divided into a plurality of areas, and an item 1616, 1617, 1618 or 1619 may be provided in each of the plurality of areas. The display controller 111 may display the list on the screen 1610. The processor 101 may detect a change of the operation progress status for the plurality of items. The display controller 111 may provide a visual feedback corresponding to an operation progress status of at least one item in the area of at least one of items 1618 and 1619, the change of the operation progress status of which is detected, among the plurality of items.

For example, the visual feedback corresponding to the operation progress status may include a percentage or a fraction 1623 or 1624 displaying a progress status for downloading data of the item 1618 or 1619 from a network to the memory 102. For example, the fraction 1623 or 1624 may display the number of currently downloaded articles with respect to the number of entire articles to be downloaded from a news channel displayed by the item 1718 or 1719. An item 1617 displaying a completion of the operation progress status or an item 1616 the operation progress of which is suspended/cancelled may include a percentage or a fraction 1622 or 1621 displaying the operation progress status corresponding to the item. An icon of the item 1617 displaying the completion of the operation progress status (or the item 1616 the operation progress of which is suspended/cancelled) may be different from an icon of the item 1618 or 1619 the operation of which is in progress.

As a response to a preset touch gesture (e.g. flick or swipe) detected on the list or the selection of the soft key 1611 or

1613, the apparatus 100 may provide a visual feedback different from that on the screen 1610. For example, the display controller 111 may display a progress bar in an area of the at least one item 1618 or 1619 corresponding to the operation progress status of the at least one item 1618 or 1619 whose change is detected.

For example, if a flick is input to the list of the screen 1610, a progress bar 1638 or 1639 may be displayed on the screen 1630 of FIG. 16B corresponding to the operation progress status of the item 1618 or 1619 whose operation is in progress. The progress bar 1638 or 1639 may be included in the list, and take an area in the same location as that of the item 1618 or 1619 corresponding thereto. The progress bar 1638 or 1639 may be sequentially displayed in an upper part, a lower part or a preset location in the order of displaying the item 1618 or 1619 whose operation is in progress. For example, the progress bar 1638 of the item 1618 may be provided on a top of the list and the progress bar 1639 of the item 1619 may be provided below the progress bar 1638 on the screen 1630.

Figure 17:
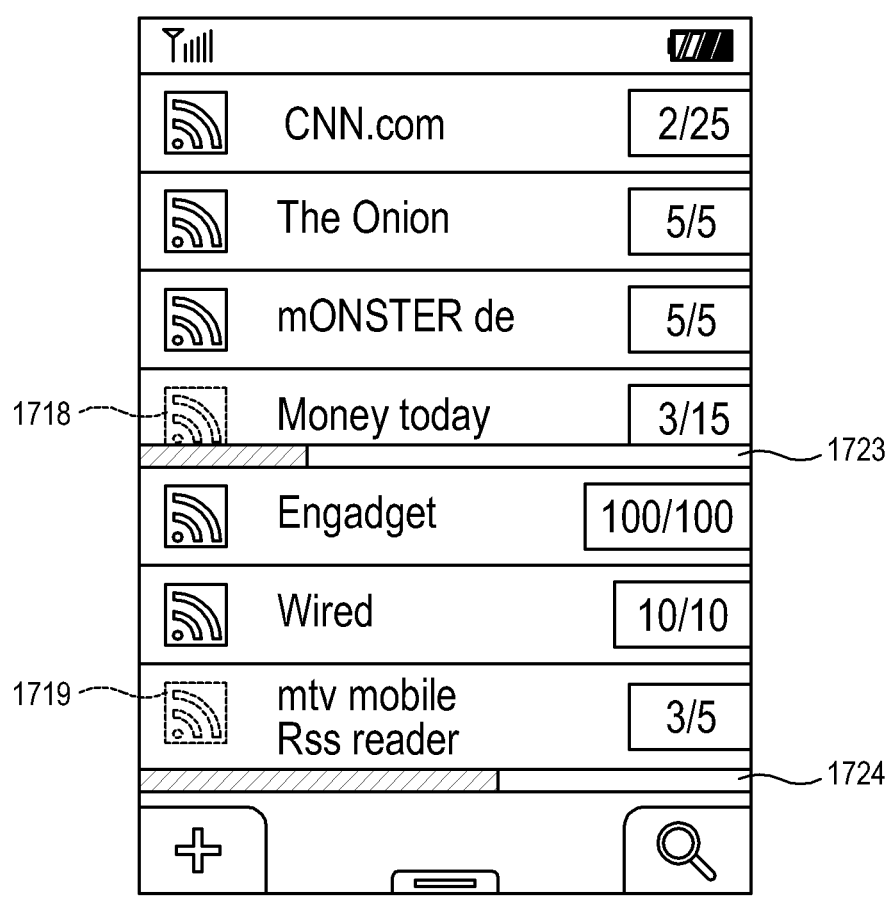
FIG. 17 illustrates an example of a screen configuration with respect to a list including an operation progress status in the apparatus according to an exemplary embodiment.

In a screen 1700 in FIG. 17, a visual feedback corresponding to the operation progress status may hold a location of a plurality of areas included in the list, and display a progress bar 1723 or 1724 in an area of the item 1718 or 1719, the change of the operation progress status of which is detected. The progress bar 1723 or 1724 may take a part of the area of the item 1718 or 1719 the change of which is detected. The progress bar 1723 or 1724 and information of the item 1718 or 1719 (name of item or icon) may be adjusted or determined to be identified, in terms of location and/or size. In a screen 1810 in FIG. 18A, a progress bar 1818 or 1819 may take all of the area of the item 1618 or 1619 the change of which is detected. In a screen 1910 in FIG. 19A, a progress bar 1918 or 1919 may overlay at least a part of the area of the item 1618 or 1619 in a semi-transparent type while maintaining the display of the item 1618 or 1619 the change of which is detected.

The display controller 111 may undo or change the visual feedback 1819 (refer to FIG. 18A) which is provided to the item displaying a completion of an operation progress status in an area of the item 1619 displaying the completion of the operation progress status among at least one of the items 1618 and 1619 the change of which is detected. For example, if the operation progress status of the item 1618 is changed from 3/15 to 10/15, a progress bar 1838 corresponding to the operation progress status may be displayed on the screen 1830 in FIG. 18B. If the operation progress status of the item 1619 is changed from 3/5 to 5/5 and displays a completion of the operation, the progress bar 1819 as the visual feedback provided is undone and the item 1619 may be changed to the item 1839 and displayed. The item 1839 may include an icon and/or a fraction 1834 displaying the completion of the operation progress.

If the operation progress status of the item 1938 is changed from 3/15 to 10/15 (1933) on a screen 1930 in FIG. 19B, a progress bar may overlay the screen 1930 corresponding to the operation progress status. If the operation progress status of the item 1939 is changed from 3/5 to 5/5 (1934) and display a completion of the operation, the progress bar provided as the visual feedback may be undone and the item 1919 may be changed to the item 1939 and displayed.

Figure 20:
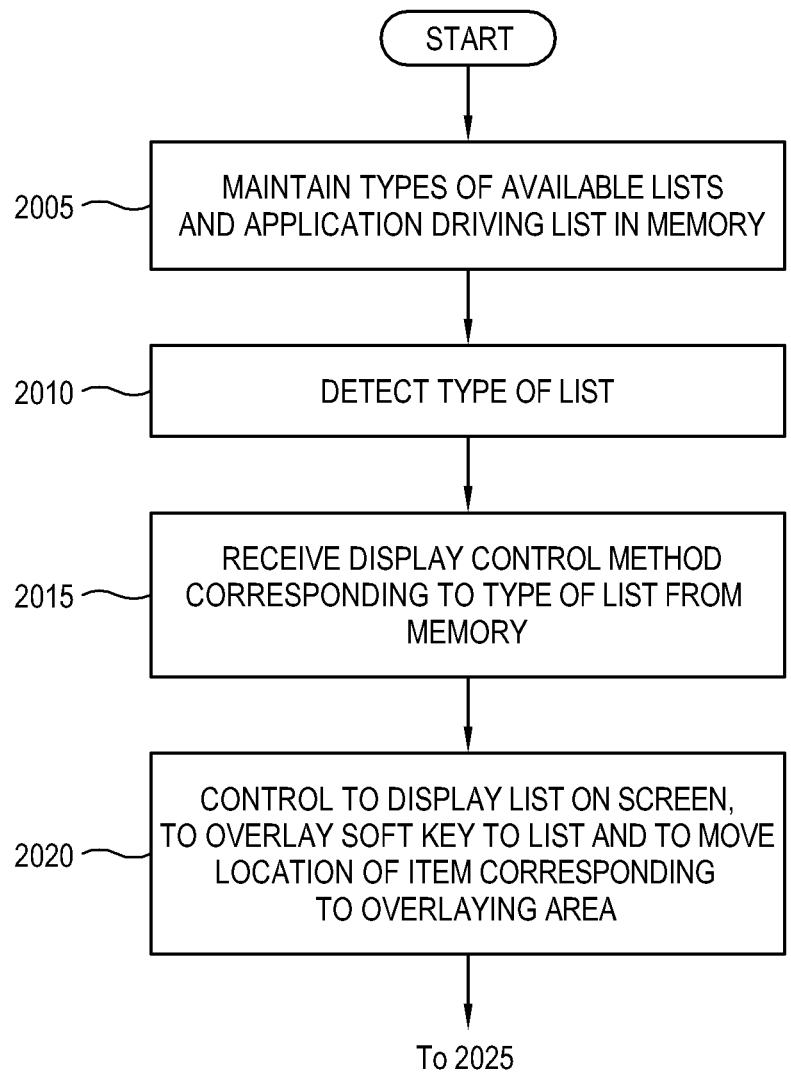
FIG. 20 is a flowchart of a method for providing a user interface to display the list according to an exemplary embodiment.

Hereinafter, a method for providing a UI displaying the list according to an exemplary embodiment will be described with reference to FIG. 20.

At operation 2005, the memory 102 of the apparatus 100 in FIG. 1 may maintain the application driving the list for the plurality of items—the screen which displays the list thereon is divided into a plurality of areas and the item is provided in each of the plurality of areas. The memory 102 may maintain the types of the list available in the apparatus 100. The types of the list may include the basic type in which the plurality of items is arranged sequentially, the grouping type in which the plurality of items is grouped and arranged according to a preset classification standard, and the expandable type in which the additional information or the subordinate item of the item selected among the plurality of items is inserted into the list of the plurality of items.

At operation 2010, the processor 101 of the apparatus 100 may detect the type of the list included in the application that drives the list.

At operation 2015, the display controller 111 of the apparatus 100 may receive from the memory 102 the display control method corresponding to the type of the list detected from the types of the list, and display the list on the screen.

At operation 2020, the apparatus 100 may control the list to be displayed on the screen or display such list on the screen. The display controller 111 of the apparatus 100 may control the M number of soft keys to overlay the list corresponding to the M number of options (M is a preset integer or less) among the N number of options included in the menu of the application on the screen. If N is larger than M, the option menu may be added to the screen (the option menu displays a window including the 'N-M' number of options excluding the M number of options from the N number of options as a response to a touch gesture of a user selecting the option menu). The M number of soft keys may be provided in the lower left side and the lower right side of the screen, and labeled by at least one of an icon and a text displaying the M number of options. The option menu may be provided in the lower left and right sides, and take a smaller area than the M number of soft keys.

At operation 2020, if an overlaying area between the plurality of items included in the list and the M number of soft keys occurs, the display controller 111 of the apparatus 100 may insert the dummy area in a preset size into one of the upper and lower parts of the item corresponding to the overlaying area and move the location of the item corresponding to the overlaying area on the screen. If the M number of soft keys overlays at least a part of the area of the first item among the areas of the plurality of items, the processor 101 of the apparatus 100 may determine whether to select the first item, as the response to the touch gesture in the area excluding the area of the M number of soft keys in the area of the first item.

At operation 2025, the processor 101 of the apparatus 100 may detect the change of the operation progress status of the plurality of items.

After the operation 2025, the display controller 111 of the apparatus 100 may provide the visual feedback corresponding to the operation progress status of at least one item, the change of which is detected, in the area of the at least one item the change of the operation progress status of which is detected among the plurality of items. Providing the visual feedback may include displaying the progress bar in the area of the at least one item the change of the operation progress status of which is detected, corresponding to the operation progress status of at least one item, the change of the operation progress status of which is detected. Also, providing the visual feedback may include undoing the visual feedback provided for the item displaying the completion of the operation in the area of the item displaying the completion of the operation progress status among the at least one of items the change of the operation progress status of which is detected. Referring to the operations 2030 to 2050, the method for providing the visual feedback to the item, the change of the operation progress status of which is detected, will be described in more detail.

At operation 2030, the processor 101 of the apparatus 100 may determine whether the item is the item, the change of the operation progress status of which is detected. If the change of the operation progress status of the item is not detected, the display controller 111 of the apparatus 100 may, at operation 2035, maintain the display of the area of the item the change of the operation progress status of which is not detected.

If the change of the operation progress status of the item is detected, the processor 101 of the apparatus 100 may, at operation 2040, determine whether the operation progress status of the item, the change of the operation progress status of which is detected, displays a completion of the operation. If the operation progress status of the item does not display the completion of the operation, the display controller 111 of the apparatus 100 may, at operation 2045, provide the visual feedback corresponding to the operation progress status of the item. Providing the visual feedback may include displaying the progress bar in the area of the item corresponding to the operation progress status of the item.

If the operation progress status of the item displays the completion of the operation, the display controller 111 of the apparatus 100 may, at operation 2050, undo the visual feedback provided to the item the operation progress status of which displays the completion.

The foregoing exemplary embodiments may be realized as a program command to be executed through various computer means and recorded in a medium read by a computer. The medium read by the computer may solely or collectively include a program command, a data file, and a data configuration. The program command which is recorded in the medium is specifically designed and configured for an exemplary embodiment, but may be known and accessible by the skilled in computer software.

A method and an apparatus is provided for a user to more intuitively and conveniently identify an operation progress status of items by providing a visual feedback corresponding to the operation progress status of the items in an area of the items if a change of the operation progress status of the item including a list is detected.

A method and an apparatus is provided to provide an environment in which an application including a list is developed more conveniently and to provide a reliable user interface by using a type of a preset list having optimized operations or control functions relating to the list.

A method and an apparatus is provided for a user to conveniently identify information of items by inserting a dummy area in a preset size into one of an upper part and a lower part of the items corresponding to an overlaying area between a list and a soft key and moving a location of the items corresponding to the overlaying area on a screen if the overlaying area between the list and the soft key occurs.

A method and an apparatus is provided to more efficiently utilize an area of a screen by determining selection or non-selection of items as a response to a touch gesture in an area excluding a soft key area from the item area corresponding to an overlaying area if the overlaying area between a list and a soft key occurs.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. An apparatus for providing a user interface, the apparatus comprising:
    a memory which maintains an application driving a list of a plurality of items;
    a display controller which controls the list to be displayed on a screen which is divided into a plurality of areas, wherein each of the plurality of items is located in each of the plurality of areas; and
    a processor which detects a change of an operation progress status of the plurality of items,
    wherein the memory maintains available list types,
    the application comprises at least one of the list types,
    the processor detects the list type included in the application, and
    the display controller receives a display control method corresponding to the detected list type from the memory, displays the list on the screen according to the display control method, provides a first visual feedback corresponding to the change of the operation progress status of at least one of the plurality of items in the area of a respective item, whose change of the operation progress status is detected, displays a second visual feedback as a progress bar corresponding to the change of the operation progress status of the respective item, whose change of the operation progress status is detected, as a transparent overlay in an area corresponding to the area of the respective item of the list, in response to receiving a user input to provide the progress bar as the second visual feedback, and
    wherein the display controller undoes the first visual feedback provided to the respective item in the area of the respective item when the operation progress status indicates a completion of an operation for the respective item.

2. The apparatus according to claim 1, wherein the memory maintains types of available lists,
    the processor detects the type of the list, and
    the display controller receives from the memory a display control method corresponding to the type of the list, and displays the list according to a received display control method, on the screen.

3. The apparatus according to claim 2, wherein the types of the list comprise at least one of:
    a basic list in which the plurality of items is sequentially arranged,
    a grouping list in which the plurality of items is grouped and arranged according to a preset classification standard, and
    an expandable list in which additional information or a subordinate item of the item selected among the plurality of items is inserted into the list.

4. The apparatus according to claim 1, wherein the display controller controls a number M of soft keys corresponding to the number M of options of a number N of options provided in a menu of the application to overlay the list on the screen and the number M is equal to or smaller than a preset integer.

5. The apparatus according to claim 4, wherein if the number N is greater than the number M, an option menu is added to the screen which displays a window comprising a number of options which is equal to a difference value between the number N and the number M, as a response to a touch gesture selecting the option menu, and
    the options, which are displayed in the window of the option menu as the response to the touch gesture selecting the option menu, are not comprised in the number M of options.

6. The apparatus according to claim 5, wherein the number M of soft keys is provided in a lower left side and a lower right side of the screen and is labeled as at least one of an icon and a text displaying the number M of options, and the option menu is provided between the lower left side and the lower right side, and occupies a smaller area than the number M of soft keys.

7. The apparatus according to claim 4, wherein if an overlaying area between the plurality of items of the list and the number M of soft keys occurs, the display controller inserts a dummy area of a preset size into one of an upper part and a lower part of the item corresponding to the overlaying area and moves a location of the item corresponding to the overlaying area on the screen.

8. The apparatus according to claim 4, wherein the processor determines whether to select a first item of the plurality of items as a response to a touch gesture in an area excluding an area of the number M of soft keys in the area corresponding to the first item if the number M of soft keys overlays at least a part of the area corresponding to the first item.

9. The apparatus according to claim 1, wherein the display controller displays the progress bar together with a name of the respective item whose change of the operation progress status is detected, in the area of the respective item.

10. The apparatus according to claim 1, wherein the screen comprises a touch screen configured to receive a selection of the list of the plurality of items to be displayed by the display controller, as the original list.

11. The apparatus according to claim 1, wherein the application is configured to drive the list of the plurality of items which is displayed on the screen, and
the first visual feedback and the progress bar are driven by the application to be displayed in a same area of the respective item, whose change of the operation progress status is detected.

12. The apparatus according to claim 1, wherein the display controller displays a name of the respective item, whose change of the operation progress status is detected, within the progress bar, above the progress bar, or below the progress bar.

13. A method for providing a user interface, the method comprising:
maintaining in a memory an application which drives a list of a plurality of items, wherein the memory maintains available list types and the application comprises at least one of the list types;
detecting the list type included in the application;
receiving a display control method corresponding to the detected list type from the memory;
displaying the list on a screen which is divided into a plurality of areas according to the display control method, wherein each of the plurality of items is provided in each of the plurality of areas;
detecting a change of an operation progress status of the plurality of items; and
providing a first visual feedback corresponding to the change of the operation progress status of at least one item in the area of a respective item, whose change of the operation progress status is detected,
wherein the providing the first visual feedback comprises displaying a second visual feedback as a progress bar corresponding to the change of the operation progress status of the respective item, whose change of the operation progress status is detected, as a transparent overlay in an area corresponding to the area of the respective item of the list, in response to receiving a user input to provide the progress bar as the second visual feedback,
wherein the providing the first visual feedback comprises:
displaying a completion of an operation in the area of the respective item, and
undoing the first visual feedback provided to the respective item in the area of the respective item.

14. The method according to claim 13, further comprising:
maintaining in the memory types of available lists; and
detecting the type of the list,
wherein the displaying the list on the screen comprises receiving from the memory a display control method corresponding to the type of the list among the types of the list and displaying the list on the screen.

15. The method according to claim 14, wherein the types of the list comprise at least one of:
a basic list in which the plurality of items is sequentially arranged,
a grouping list in which the plurality of items is grouped and arranged according to a preset classification standard, and
an expandable list in which additional information or a subordinate item of the item selected among the plurality of items is inserted into the list.

16. The method according to claim 13, wherein the displaying the list on the screen comprises overlaying a number M of soft keys on the list corresponding to the number M of options of a number N of options comprised in a menu of the application on the screen, and the number M is equal to or smaller than a preset integer.

17. The method according to claim 16, wherein if the number N is larger than the number M, an option menu is added to the screen which displays a window comprising a number of options which is equal to a difference value between the number N and the number M, as a response to a touch gesture selecting the option menu, and
the options, which are displayed in the window of the option menu as the response to the touch gesture selecting the option menu, are not comprised in the number M of options.

18. The method according to claim 17, wherein the number M of soft keys is provided in a lower left side and a lower right side of the screen and is labeled as at least one of an icon and a text displaying the number M of options, and the option menu is provided between the lower left side and the lower right side, and takes a smaller area than the number M of soft keys.

19. The method according to claim 16, wherein the displaying the list on the screen comprises:
inserting a dummy area of a preset size into one of an upper part and a lower part of the item corresponding to an overlaying area between the plurality of items of the list and the number M of soft keys; and
moving a location of the item corresponding to the overlaying area on the screen if the overlaying area between the plurality of items of the list and the M number of soft keys occurs.

20. The method according to claim 16, further comprising:
determining whether to select a first item of the plurality of items as a response to a touch gesture in an area excluding an area of the number M of soft keys from the area corresponding to the first item if the number M of soft keys overlays at least a part of the area corresponding to the first item.

* * * * *